(12) United States Patent
Chang et al.

(10) Patent No.: US 11,770,726 B2
(45) Date of Patent: Sep. 26, 2023

(54) COMMUNICATION METHOD AND COMMUNICATIONS APPARATUS

(71) Applicant: Huawei Cloud Computing Technologies Co., Ltd., Guizhou (CN)

(72) Inventors: Hongna Chang, Xi'an (CN); Kai Zhou, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 229 days.

(21) Appl. No.: 17/018,589

(22) Filed: Sep. 11, 2020

(65) Prior Publication Data
US 2020/0413280 A1 Dec. 31, 2020

Related U.S. Application Data

(63) Continuation of application No. PCT/CN2019/077694, filed on Mar. 11, 2019.

(30) Foreign Application Priority Data

Mar. 12, 2018 (CN) .......................... 201810200890.9

(51) Int. Cl.
*H04W 24/10* (2009.01)
*G16Y 40/30* (2020.01)
*G16Y 40/20* (2020.01)

(52) U.S. Cl.
CPC ............. *H04W 24/10* (2013.01); *G16Y 40/20* (2020.01); *G16Y 40/30* (2020.01)

(58) Field of Classification Search
None
See application file for complete search history.

(56) References Cited

U.S. PATENT DOCUMENTS

| 7,236,465 B2 | 6/2007 | Banerjee et al. |
| 2002/0030545 A1 | 3/2002 | Hashemi et al. |
| 2011/0199905 A1 | 8/2011 | Pinheiro et al. |
| 2011/0201267 A1 | 8/2011 | Synnergren et al. |
| 2012/0294146 A1 | 11/2012 | Wu |
| 2013/0160140 A1 | 6/2013 | Jin et al. |
| 2013/0265953 A1 | 10/2013 | Salkintzis et al. |
| 2014/0172183 A1 | 6/2014 | Beeman |
| 2015/0099555 A1 | 4/2015 | Krishnaswamy et al. |

(Continued)

FOREIGN PATENT DOCUMENTS

| CN | 101730136 A | 6/2010 |
| CN | 102469503 A | 5/2012 |

(Continued)

*Primary Examiner* — Walter J Divito
(74) *Attorney, Agent, or Firm* — Conley Rose, P.C.

(57) ABSTRACT

A communication method includes obtaining, by an Internet of things platform, historical load of a serving cell of a terminal, determining, by the Internet of things platform, a data reporting time of the terminal based on the historical load of the serving cell, and sending, by the Internet of things platform to the terminal, a time at which the terminal reports data. In this embodiment, the data reporting time of the terminal is determined based on the historical load of the serving cell and a time range in which the terminal can report data.

20 Claims, 9 Drawing Sheets

(56) References Cited

U.S. PATENT DOCUMENTS

| | | | |
|---|---|---|---|
| 2015/0264512 A1* | 9/2015 | Jain | H04W 4/70 370/328 |
| 2016/0142492 A1 | 5/2016 | Fang et al. | |
| 2016/0262144 A1 | 9/2016 | Kitazoe et al. | |
| 2018/0048710 A1* | 2/2018 | Altin | G06F 13/4282 |
| 2020/0374865 A1* | 11/2020 | Tang | H04W 16/14 |

FOREIGN PATENT DOCUMENTS

| | | |
|---|---|---|
| CN | 102754512 A | 10/2012 |
| CN | 102137105 B | 11/2012 |
| CN | 103702344 A | 4/2014 |
| CN | 103873498 A | 6/2014 |
| CN | 104365159 A | 2/2015 |
| CN | 102404821 B | 7/2015 |
| CN | 105119769 A | 12/2015 |
| CN | 105556993 A | 5/2016 |
| CN | 102223729 B | 6/2016 |
| CN | 102264118 B | 6/2016 |
| CN | 102281502 B | 7/2016 |
| CN | 105873127 A | 8/2016 |
| CN | 106293929 A | 1/2017 |
| CN | 102843233 B | 5/2017 |
| CN | 103796201 B | 6/2017 |
| CN | 106851526 A | 6/2017 |
| CN | 107508869 A | 12/2017 |
| EP | 2192807 A1 | 6/2010 |
| JP | 2013520100 A | 5/2013 |
| JP | 2014526230 A | 10/2014 |
| JP | 2016100893 A | 5/2016 |
| JP | 2018511221 A | 4/2018 |
| WO | 2012151805 A1 | 11/2012 |
| WO | 2013165284 A1 | 11/2013 |
| WO | 2016140828 A1 | 9/2016 |
| WO | 2017175070 A1 | 10/2017 |

\* cited by examiner

COMMUNICATION METHOD AND COMMUNICATIONS APPARATUS

CROSS-REFERENCE TO RELATED APPLICATIONS

This application is a continuation of International Patent Application No. PCT/CN2019/077694, filed on Mar. 11, 2019, which claims priority to Chinese Patent Application No. 201810200890.9, filed on Mar. 12, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

A Narrowband Internet of Things (NB-IoT) is a wide area network with low power consumption and limited bandwidth, and a quantity of NB-IoT terminals connected at a same time is also limited. With intelligent evolution of vertical industries, the quantity of NB-IoT terminals is increasing. NB-IoT chips/modules are deployed for street lamps, gas meters, water meters, shared bicycles, manhole covers, and the like, to implement a function of the NB-IoT terminal. These NB-IoT terminals may report data to an Internet of things platform using the NB-IoT at a same time, for example, all gas meters in a same community may perform reporting at a same time, or when a gas meter is reporting a message, street lamps register with a network together, thereby causing network congestion.

To prevent a large quantity of NB-IoT terminals (in a same industry or across industries) from accessing an NB-IoT network at a same time, in other approaches, a reporting start time (Schedule Start Time), a random reporting window (Randomized Delivery Window), a reporting frequency, and the like are set for each terminal. After the reporting start time, the terminal reports data to the Internet of things platform at any time point within a time range of the specified random reporting window. In addition, a different reporting start time and a different random reporting window may be set for each terminal such that uplink messages reported by the terminals can be discrete.

However, in other approaches, each terminal may perform reporting at any time in a random reporting time window. Therefore, a plurality of terminals may perform reporting at a same time, thereby causing network congestion and a reporting failure.

SUMMARY

Embodiments of this application provide a communication method and a communications apparatus, to avoid network congestion caused by data reporting of a terminal, and improve a success rate of the data reporting of the terminal.

According to a first aspect, an embodiment of this application provides a communication method. The method includes obtaining, by an Internet of things platform, historical load of a serving cell of a terminal, then, determining a data reporting time of the terminal based on the historical load of the serving cell, and then, sending the data reporting time to the terminal.

In a possible design, the determining a data reporting time of the terminal based on the historical load of the serving cell includes determining, by the Internet of things platform, predicted load of the serving cell in a preset time period from a current time based on the historical load of the serving cell, and then, determining the data reporting time of the terminal based on the predicted load of the serving cell in the preset time period from the current time.

In a possible design, the obtaining, by an Internet of things platform, historical load of a serving cell of a terminal includes obtaining, by the Internet of things platform, historical load of at least one cell, where the at least one cell includes the serving cell of the terminal, and then, obtaining the historical load of the serving cell from the historical load of the at least one cell based on the serving cell of the terminal.

In a possible design, the obtaining, by the Internet of things platform, historical load of at least one cell includes obtaining, by the Internet of things platform, the historical load of the at least one cell from a network management device.

In a possible design, the obtaining, by the Internet of things platform, historical load of at least one cell includes obtaining, by the Internet of things platform, the historical load of the at least one cell from a base station, where the base station is a serving base station of the terminal, and the at least one cell is a cell within coverage of the base station.

In a possible design, the obtaining, by the Internet of things platform, historical load of at least one cell includes obtaining, by the Internet of things platform, the historical load of the at least one cell from a Service Capability Exposure Function (SCEF).

In a possible design, the obtaining, by the Internet of things platform, the historical load of the at least one cell from an SCEF includes sending, by the Internet of things platform, a first message to the SCEF, where the first message includes information used to request the historical load, identification information of the at least one cell, and/or identification information of a base station, and then, receiving the identification information of the at least one cell that is sent by the SCEF, where the base station is a serving base station of the terminal, and the at least one cell is a cell within coverage of the base station.

In a possible design, the Internet of things platform further obtains a time range in which the terminal can report data.

The determining, by the Internet of things platform, a data reporting time of the terminal based on the historical load of the serving cell includes determining, by the Internet of things platform, the data reporting time of the terminal based on the historical load of the serving cell and the time range in which data can be reported.

In a possible design, the obtaining, by the Internet of things platform, a time range in which the terminal can report data includes receiving, by the Internet of things platform, the time range that is sent by the terminal and in which data can be reported.

In a possible design, before receiving the time range that is sent by the terminal and in which data can be reported, the Internet of things platform further sends first information to the terminal, where the first information is used to request the time range in which data can be reported.

In a possible design, the obtaining, by the Internet of things platform, a time range in which the terminal can report data includes receiving, by the Internet of things platform, a time range that is sent by an application server and corresponds to a service type of the terminal and in which data can be reported.

In a possible design, the Internet of things platform further receives second information sent by the application server, where the second information is used to indicate a service type provided by the application server, and the service type provided by the application server is the same as the service type of the terminal. Then, the Internet of things platform determines at least one time range based on the service type provided by the application server and the historical load of the at least one cell, and further sends the at least one time range to the application server, where the at least one time range is used by the application server to determine, based on the at least one time range, the time range that corresponds to the service type of the terminal and in which data can be reported.

In a possible design, the Internet of things platform further receives information that is about the serving cell of the terminal and that is sent by the terminal.

In a possible design, the Internet of things platform further sends information used to request to obtain the serving cell of the terminal to the terminal.

In a possible design, the Internet of things platform further receives a reporting type of the terminal that is sent by the terminal, where the reporting type is used to indicate that a data reporting type of the terminal is periodic reporting or event-triggered reporting.

In a possible design, the Internet of things platform further sends information used to request the reporting type of the terminal to the terminal.

In a possible design, if the reporting type of the terminal is event-triggered reporting, before determining the data reporting time of the terminal based on the historical load of the serving cell of the terminal, the Internet of things platform further receives a second message sent by the application server, where the second message includes information used to request data reported by the terminal.

In a possible design, the determining a data reporting time of the terminal based on the historical load of the serving cell includes, after detecting that the terminal is connected to the Internet of things platform, determining, by the Internet of things platform, the data reporting time of the terminal based on the historical load of the serving cell.

In a possible design, after determining the data reporting time of the terminal, the Internet of things platform further receives a third message sent by the terminal, where the third message includes information used to indicate that the serving cell of the terminal changes and information about a changed serving cell, and then, updates the data reporting time of the terminal based on historical load of the changed serving cell.

In a possible design, after determining the data reporting time of the terminal, the Internet of things platform further receives a fourth message sent by the application server or the terminal, where the fourth message includes information used to indicate that the time range in which the terminal can report data changes and a changed time range in which data can be reported, and then, updates the data reporting time of the terminal based on the historical load of the serving cell and the changed time range in which data can be reported.

In a possible design, after determining the data reporting time of the terminal, the Internet of things platform further receives a fifth message sent by the application server, where the fifth message includes information used to request to change the data reporting time of the terminal, and then, updates the data reporting time of the terminal based on the historical load of the serving cell.

In a possible design, before the Internet of things platform performs the method according to any one of the foregoing possible designs, the Internet of things platform determines that the terminal supports data reporting performed at a data reporting time that is set by the Internet of things platform.

In a possible design, before determining that the terminal supports data reporting performed at the data reporting time that is set by the Internet of things platform, the Internet of things platform further receives third information sent by the terminal, where the third information is used to indicate that the terminal can report data at the data reporting time that is set by the Internet of things platform.

According to a second aspect, an embodiment of this application provides a communications apparatus. The apparatus includes a receiving module configured to obtain historical load of a serving cell of a terminal, a processing module configured to determine a data reporting time of the terminal based on the historical load of the serving cell, and a sending module configured to send the data reporting time to the terminal.

In a possible design, the processing module is further configured to determine predicted load of the serving cell in a preset time period from a current time based on the historical load of the serving cell, and determine the data reporting time of the terminal based on the predicted load of the serving cell in the preset time period from the current time.

In a possible design, the receiving module is further configured to obtain historical load of at least one cell, where the at least one cell includes the serving cell of the terminal, and obtain the historical load of the serving cell from the historical load of the at least one cell based on the serving cell of the terminal.

In a possible design, the receiving module is further configured to obtain the historical load of the at least one cell from a network management device.

In a possible design, the receiving module is further configured to obtain the historical load of the at least one cell from a base station, where the base station is a serving base station of the terminal, and the at least one cell is a cell within coverage of the base station.

In a possible design, the receiving module is further configured to obtain the historical load of the at least one cell from an SCEF.

In a possible design, the sending module is further configured to send a first message to the SCEF before the receiving module receives identification information that is of the at least one cell and that is sent by the SCEF, where the first message includes information used to request the historical load, the identification information of the at least one cell, and/or identification information of a base station, where the base station is a serving base station of the terminal, and the at least one cell is a cell within coverage of the base station.

In a possible design, the receiving module is further configured to obtain a time range in which the terminal can report data. The processing module is further configured to determine the data reporting time of the terminal based on the historical load of the serving cell and the time range in which data can be reported.

In a possible design, the receiving module is further configured to receive the time range that is sent by the terminal and in which data can be reported.

In a possible design, the sending module is further configured to send first information to the terminal, where the first information is used to request the time range in which data can be reported.

In a possible design, the receiving module is further configured to receive a time range that is sent by an application server and corresponds to a service type of the terminal and in which data can be reported, and determine, as the time range in which the terminal can report data, the time range that corresponds to the service type of the terminal and in which data can be reported.

In a possible design, the receiving module is further configured to receive second information sent by the application server, where the second information is used to indicate a service type provided by the application server, and the service type provided by the application server is the same as the service type of the terminal. The processing module is further configured to determine at least one time range based on the service type provided by the application server and the historical load of the at least one cell. The sending module is further configured to send the at least one time range to the application server, where the at least one time range is used by the application server to determine, based on the at least one time range, the time range that corresponds to the service type of the terminal and in which data can be reported.

In a possible design, the receiving module is further configured to receive information that is about the serving cell of the terminal and that is sent by the terminal.

In a possible design, the sending module is further configured to send information used to request to obtain the serving cell of the terminal to the terminal.

In a possible design, the receiving module is further configured to receive a reporting type of the terminal that is sent by the terminal, where the reporting type is used to indicate that a data reporting type of the terminal is periodic reporting or event-triggered reporting.

In a possible design, the sending module is further configured to send information used to request the reporting type of the terminal to the terminal.

In a possible design, if the reporting type of the terminal is event-triggered reporting, the receiving module is further configured to receive a second message sent by the application server, where the second message includes information used to request data reported by the terminal.

In a possible design, the processing module is further configured to, after detecting that the terminal is connected to the Internet of things platform, determine the data reporting time of the terminal based on the historical load of the serving cell.

In a possible design, the receiving module is further configured to, after the processing module determines the data reporting time of the terminal, receive a third message sent by the terminal, where the third message includes information used to indicate that the serving cell of the terminal changes and information about a changed serving cell.

The processing module is further configured to update the data reporting time of the terminal based on historical load of the changed serving cell.

In a possible design, the receiving module is further configured to, after the processing module determines the data reporting time of the terminal, receive a fourth message sent by the application server, where the fourth message includes information used to indicate that the time range in which the terminal can report data changes and a changed time range in which data can be reported.

The processing module is further configured to update the data reporting time of the terminal based on the historical load of the serving cell and the changed time range in which data can be reported.

In a possible design, the receiving module is further configured to, after the processing module determines the data reporting time of the terminal, receive a fifth message sent by the application server, where the fifth message includes information used to instruct to change the data reporting time of the terminal.

The processing module is further configured to update the data reporting time of the terminal based on the historical load of the serving cell.

In a possible design, the processing module is further configured to, before the Internet of things platform executes the solution according to any one of the embodiments of this application in the second aspect, determine that the terminal supports data reporting performed at a data reporting time that is set by the Internet of things platform.

In a possible design, the receiving module is further configured to, before the processing module determines that the terminal supports data reporting performed at the data reporting time that is set by the Internet of things platform, receive third information sent by the terminal, where the third information is used to indicate that the terminal can report data at the data reporting time that is set by the Internet of things platform.

According to a third aspect, an embodiment of this application provides a communications apparatus. The apparatus includes a memory and a processor. The memory is configured to store a program instruction, and the processor is configured to invoke the program instruction in the memory to perform the communication method in the first aspect.

In a possible design, the communications apparatus further includes a communications interface, and the communications interface is configured to perform receiving and sending actions in the first aspect.

It should be noted that the communications apparatus in the second aspect or the third aspect may be an Internet of things platform, or may be a component that may be used for the Internet of things platform.

According to a fourth aspect, an embodiment of this application provides a readable storage medium. The readable storage medium stores a computer program, and when the computer program is executed, the communication method according to any one of the embodiments of this application in the first aspect is implemented.

According to a fifth aspect, an embodiment of this application provides a communication method. The method includes receiving, by a terminal, data reporting time of the terminal that is sent by an Internet of things platform, and then, reporting, by the terminal, data to the Internet of things platform based on the data reporting time.

In a possible design, the terminal further sends, to the Internet of things platform, a time range in which the terminal can report data.

In a possible design, the terminal further receives first information sent by the Internet of things platform, where the first information is used to request the time range in which the terminal can report data.

In a possible design, the terminal further sends information about a serving cell of the terminal to the Internet of things platform.

In a possible design, the terminal further receives information that is used to request to obtain the serving cell of the terminal and that is sent by the Internet of things platform.

In a possible design, the terminal further sends a reporting type of the terminal to the Internet of things platform, where the reporting type is used to indicate that a data reporting type of the terminal is periodic reporting or event-triggered reporting.

In a possible design, the terminal further receives information that is used to request the reporting type of the terminal and that is sent by the Internet of things platform.

In a possible design, the terminal further receives an updated data reporting time sent by the Internet of things platform, and then reports data to the Internet of things platform based on the updated data reporting time.

In a possible design, the terminal further sends a third message to the Internet of things platform, where the third message includes information used to indicate that the serving cell of the terminal changes and information about a changed serving cell.

In a possible design, the terminal further sends a fourth message to the Internet of things platform, where the fourth message includes information used to indicate that the time range in which the terminal can report data changes and a changed time range in which data can be reported.

In a possible design, the terminal further sends a fifth message to the Internet of things platform, where the fifth message includes information used to instruct to change the data reporting time of the terminal.

In a possible design, the terminal further sends third information to the Internet of things platform, where the third information is used to indicate that the terminal can report data at a data reporting time that is set by the Internet of things platform.

According to a sixth aspect, an embodiment of this application provides a communications apparatus. The apparatus includes a receiving module configured to receive data reporting time of the terminal that is sent by an Internet of things platform, and a sending module configured to send data to the Internet of things platform based on the data reporting time.

In a possible design, the sending module is further configured to send, to the Internet of things platform, a time range in which the terminal can report data.

In a possible design, the receiving module is further configured to, before the sending module sends, to the Internet of things platform, the time range in which the terminal can report data, receive first information sent by the Internet of things platform, where the first information is used to request the time range in which the terminal can report data.

In a possible design, the sending module is further configured to send information about a serving cell of the terminal to the Internet of things platform.

In a possible design, the receiving module is further configured to receive information that is used to request to obtain the serving cell of the terminal and that is sent by the Internet of things platform.

In a possible design, the sending module is further configured to send a reporting type of the terminal to the Internet of things platform, where the reporting type is used to indicate that a data reporting type of the terminal is periodic reporting or event-triggered reporting.

In a possible design, the receiving module is further configured to receive information that is used to request the reporting type of the terminal and that is sent by the Internet of things platform.

In a possible design, the receiving module is further configured to receive an updated data reporting time sent by the Internet of things platform, and the sending module is further configured to report data to the Internet of things platform based on the updated data reporting time.

In a possible design, the sending module is further configured to send a third message to the Internet of things platform, where the third message includes information used to indicate that the serving cell of the terminal changes and information about a changed serving cell.

In a possible design, the sending module is further configured to send a fourth message to the Internet of things platform, where the fourth message includes information used to indicate that the time range in which the terminal can report data changes and a changed time range in which data can be reported.

In a possible design, the sending module is further configured to send a fifth message to the Internet of things platform, where the fifth message includes information used to instruct to change the data reporting time of the terminal.

In a possible design, the sending module is further configured to send third information to the Internet of things platform, where the third information is used to indicate that the terminal can report data at a data reporting time that is set by the Internet of things platform.

According to a seventh aspect, an embodiment of this application provides a communications apparatus. The apparatus includes a memory and a processor, where the memory is configured to store a program instruction, and the processor is configured to invoke the program instruction in the memory to perform the communication method in the fifth aspect.

In a possible design, the communications apparatus further includes a communications interface, and the communications interface is configured to perform receiving and sending actions in the fifth aspect.

It should be noted that the communications apparatus in the sixth aspect or the seventh aspect may be a terminal, or may be a component that may be used for a terminal.

According to an eighth aspect, an embodiment of this application provides a readable storage medium. The readable storage medium stores a computer program, and when the computer program is executed, the communication method according to any one of the embodiments of this application in the fifth aspect is implemented.

According to a ninth aspect, an embodiment of this application provides a communication method. The method includes sending, by an application server to an Internet of things platform, a time range that corresponds to a service type of a terminal and in which data can be reported.

In a possible implementation, the application server further sends second information to the Internet of things platform, where the second information is used to indicate a service type provided by the application server, and the service type provided by the application server is the same as the service type of the terminal.

In a possible implementation, the application server further receives at least one time range sent by the Internet of things platform, and the application server determines, based on the at least one time range, the time range that corresponds to the service type of the terminal and in which data can be reported.

In a possible implementation, the application server further sends a second message to the Internet of things platform, where the second message includes information used to request data reported by the terminal.

In a possible implementation, the application server further sends a fourth message to the Internet of things platform, where the fourth message includes information used to indicate that the time range in which the terminal can report data changes and information about a changed time range in which data can be reported.

In a possible implementation, the application server further sends a fifth message to the Internet of things platform, where the fifth message includes information used to instruct to change a data reporting time of the terminal.

According to a tenth aspect, an embodiment of this application provides a communications apparatus. The apparatus includes a sending module configured to send, to an Internet of things platform, a time range that corresponds to a service type of a terminal and in which data can be reported.

In a possible implementation, the sending module is further configured to send second information to the Internet of things platform, where the second information is used to indicate a service type provided by the application server, and the service type provided by the application server is the same as the service type of the terminal.

In a possible implementation, the communications apparatus further includes a receiving module configured to receive the at least one time range sent by the Internet of things platform, and a processing module configured to determine, based on the at least one time range, the time range that corresponds to the service type of the terminal and in which data can be reported.

In a possible implementation, the sending module is further configured to send a second message to the Internet of things platform, where the second message includes information used to request data reported by the terminal.

In a possible implementation, the sending module is further configured to send a third message to the Internet of things platform, where the third message includes information used to indicate that the time range in which the terminal can report data changes and a changed time range in which data can be reported.

In a possible implementation, the sending module is further configured to send a fourth message to the Internet of things platform, where the fourth message includes information used to instruct to change a data reporting time of the terminal.

According to an eleventh aspect, an embodiment of this application provides a communications apparatus. The apparatus includes a memory and a processor. The memory is configured to store a program instruction, and the processor is configured to invoke the program instruction in the memory to perform the communication method in the ninth aspect.

In a possible design, the communications apparatus further includes a communications interface, and the communications interface is configured to perform receiving and sending actions in the ninth aspect.

It should be noted that the communications apparatus in the tenth aspect or the eleventh aspect may be an application server, or may be a component that may be used for an application server.

According to a twelfth aspect, an embodiment of this application provides a readable storage medium. The readable storage medium stores a computer program, and when the computer program is executed, the communication method according to any one of the embodiments of this application in the ninth aspect is implemented.

According to a thirteenth aspect, an embodiment of this application provides a communication method. The method includes sending, by a base station, information about historical load of at least one cell to the Internet of things platform.

In a possible implementation, the base station further receives information that is sent by the Internet of things platform and that is used to request the historical load of the at least one cell.

According to a fourteenth aspect, an embodiment of this application provides a communications apparatus. The apparatus includes a sending module configured to send information about historical load of at least one cell to an Internet of things platform.

In a possible implementation, the communications apparatus further includes a receiving module configured to receive information that is sent by the Internet of things platform and that is used to request the historical load of the at least one cell.

According to a fifteenth aspect, an embodiment of this application provides a communications apparatus. The apparatus includes a memory and a processor. The memory is configured to store a program instruction, and the processor is configured to invoke the program instruction in the memory to perform the communication method in the thirteenth aspect.

In a possible design, the communications apparatus further includes a communications interface, and the communications interface is configured to perform receiving and sending actions in the thirteenth aspect.

It should be noted that the communications apparatus in the fourteenth aspect or the fifteenth aspect may be a base station, or may be a component that may be used for a base station.

According to a sixteenth aspect, an embodiment of this application provides a readable storage medium. The readable storage medium stores a computer program, and when the computer program is executed, the communication method according to any one of the embodiments of this application in the thirteenth aspect is implemented.

According to a seventeenth aspect, an embodiment of this application provides a communication method. The method includes sending, by a network management device, information about historical load of at least one cell to an Internet of things platform.

In a possible design, the network management device further receives information that is sent by the Internet of things platform and that is used to request the historical load of the at least one cell.

In a possible design, the network management device further receives information that is about the historical load of the at least one cell and that is sent by a base station, where the at least one cell is a cell within coverage of the base station.

According to an eighteenth aspect, an embodiment of this application provides a communications apparatus. The apparatus includes a sending module configured to send information about historical load of at least one cell to an Internet of things platform.

In a possible design, the communications apparatus further includes a receiving module configured to receive information that is sent by the Internet of things platform and that is used to request the historical load of the at least one cell.

In a possible design, the receiving module is further configured to receive information that is about the historical load of the at least one cell and that is sent by a base station, where the at least one cell is a cell within coverage of the base station.

According to a nineteenth aspect, an embodiment of this application provides a communications apparatus. The apparatus includes a memory and a processor. The memory is configured to store a program instruction, and the processor is configured to invoke the program instruction in the memory to perform the communication method in the seventeenth aspect.

In a possible design, the communications apparatus further includes a communications interface, and the communications interface is configured to perform receiving and sending actions in the seventeenth aspect.

It should be noted that the communications apparatus in the eighteenth aspect or the nineteenth aspect may be a network management device, or may be a component that may be used for a network management device.

According to a twentieth aspect, an embodiment of this application provides a readable storage medium. The readable storage medium stores a computer program, and when the computer program is executed, the communication method according to any one of the embodiments of this application in the seventeenth aspect is implemented.

According to a twenty-first aspect, an embodiment of this application provides a communication method. The method includes sending, by an SCEF, information about historical load of at least one cell to an Internet of things platform.

In a possible design, the SCEF further receives a first message sent by the Internet of things platform, where the first message includes information used to request the historical load.

In a possible design, the first message further includes identification information of the at least one cell and/or identification information of a base station, where the at least one cell is a cell within coverage of the base station.

In a possible design, the sending, by an SCEF, information about historical load of at least one cell to an Internet of things platform includes sending, by the SCEF, the historical load of the at least one cell to the Internet of things platform after authorization and verification on the Internet of things platform succeed.

In a possible design, the SCEF further sends, to the base station, information used to request the historical load of the at least one cell, and then receives the historical load of the at least one cell that is sent by the base station.

According to a twenty-second aspect, an embodiment of this application provides a communications apparatus. The apparatus includes a sending module configured to send information about historical load of at least one cell to an Internet of things platform.

In a possible design, the communications apparatus further includes a receiving module configured to receive a first message sent by the Internet of things platform, where the first message includes information used to request the historical load.

In a possible design, the first message further includes identification information of the at least one cell and/or identification information of a base station, where the at least one cell is a cell within coverage of the base station.

In a possible design, the communications apparatus further includes a processing module configured to perform authorization and verification on the Internet of things platform, and the sending module is further configured to, after the processing module authorizes and verifies the Internet of things platform, send the historical load of the at least one cell to the Internet of things platform.

In a possible design, the sending module is further configured to send, to the base station, information used to request the historical load of the at least one cell, and the receiving module is further configured to receive the historical load of the at least one cell that is sent by the base station.

According to a twenty-third aspect, an embodiment of this application provides a communications apparatus. The apparatus includes a memory and a processor. The memory is configured to store a program instruction, and the processor is configured to invoke the program instruction in the memory to perform the communication method in the twenty-first aspect.

In a possible design, the communications apparatus further includes a communications interface, and the communications interface is configured to perform receiving and sending actions in the twenty-first aspect.

It should be noted that the communications apparatus in the twenty-second aspect or the twenty-third aspect may be an SCEF, or may be a component that may be used for an SCEF.

According to a twenty-fourth aspect, an embodiment of this application provides a readable storage medium, where the readable storage medium stores a computer program, and when the computer program is executed, the communication method according to any one of the embodiments of this application in the twenty-first aspect is implemented.

In conclusion, the Internet of things platform determines the data reporting time of the terminal based on the historical load of the serving cell, and sends the data reporting time to the terminal, and the terminal reports data to the Internet of things platform based on the data reporting time received from the Internet of things platform. In the embodiments, the data reporting time of the terminal is determined based on the historical load of the serving cell. Therefore, the determined data reporting time may be, for example, a time at which the load of the serving cell is the lowest. Therefore, the terminal may report data at staggered times such that a large quantity of terminals can be prevented from performing reporting at a same time, network congestion is avoided, and a network use rate and a success rate of data reporting are improved.

DESCRIPTION OF EMBODIMENTS

Figure 1:
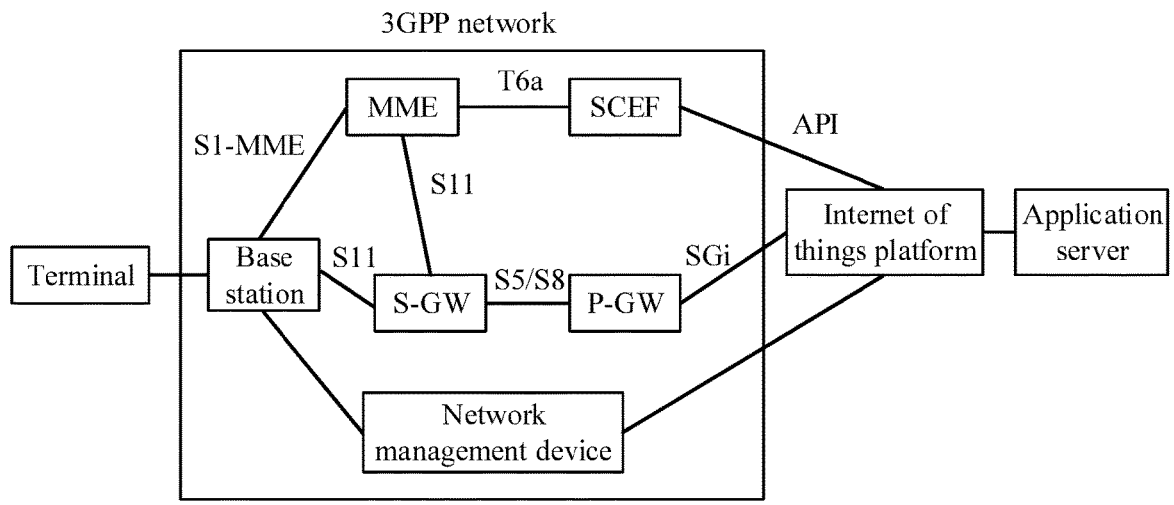
FIG. 1 is a schematic diagram of a communications system according to an embodiment of this application.

FIG. 1 is a schematic diagram of a communications system according to an embodiment of this application. As shown in FIG. 1, a terminal may report data to an Internet of things platform using a 3rd Generation Partnership Project (3GPP) network, and the Internet of things platform may transmit, to an application server, data reported by at least one terminal. The Internet of things platform and the application server may be connected using the Internet. The terminal may communicate with the Internet of things platform using, for example, a Lightweight Machine to Machine (LwM2M) protocol, but this embodiment of this application is not limited thereto.

An SCEF is configured to connect the 3GPP network to the Internet of things platform, and provides an interface for interaction between the 3GPP network and the Internet of things platform, and exposes some capabilities in the 3GPP network to the Internet of things platform such that the Internet of things platform can obtain location information of the terminal (including information about a serving cell of the terminal and the like) and network status information from the 3GPP network.

The Internet of things platform is configured to manage terminals. These terminals may be connected to the Internet of things platform using the 3GPP network. The Internet of things platform may perform registration, authentication, and uplink and downlink message traffic management and the like on the terminals.

A base station shown in FIG. 1 is also referred to as a radio access network (RAN) device, and is a device that connects the terminal to a radio network. The base station may be an evolved NodeB (eNB or eNodeB) in Long Term Evolution (LTE), a relay station or an access point, or a base station in a 5G network, such as a Transmission and Reception Point (TRP) or a controller. This is not limited herein.

The terminal shown in FIG. 1 may be a wireless terminal or a wired terminal. The wireless terminal may be a device with a wireless receiving/transmitting function, and may be deployed on land including indoor or outdoor, handheld, or in-vehicle, or may be deployed on a water surface (for example, on a ship), or may be deployed in the air (for example, on an airplane, a balloon, and a satellite). The terminal device may be a mobile phone, a tablet computer (Pad), a computer with a wireless receiving/transmitting function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. This is not limited herein.

Figure 2:
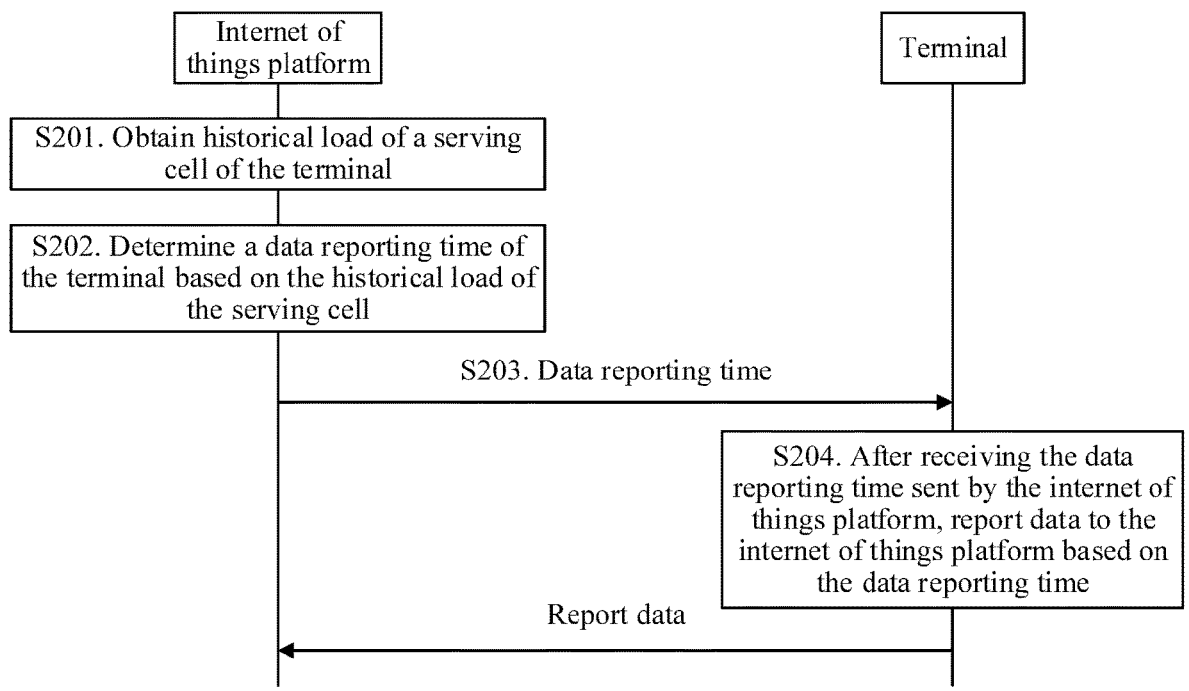
FIG. 2 is a flowchart of a communication method according to an embodiment of this application.

FIG. 2 is a flowchart of a communication method according to an embodiment of this application. As shown in FIG. 2, the method in this embodiment may include the following steps.

S201. An Internet of things platform obtains historical load of a serving cell of a terminal.

In this embodiment, the Internet of things platform may obtain the historical load of the serving cell of the terminal. The historical load of the serving cell may be historical load in a period of time before a current time. A size of the period of time may be, for example, preset. For example, historical load in each minute in the period of time before the current time may be obtained. The serving cell of the terminal is a serving cell in which the terminal is located, or a serving cell to which the terminal belongs.

S202. The Internet of things platform determines a data reporting time of the terminal based on the historical load of the serving cell.

In this embodiment, after obtaining the historical load of the serving cell of the terminal, the Internet of things platform determines the data reporting time of the terminal based on the historical load of the serving cell. In some embodiments, the Internet of things platform determines, based on the historical load of the serving cell, that a time at which load of the serving cell is relatively small is the data reporting time of the terminal. For example, the Internet of things platform may determine that a time at which the load of the serving cell is the lowest is the data reporting time of the terminal.

S203. The Internet of things platform sends the data reporting time to the terminal.

In this embodiment, the Internet of things platform sends the data reporting time that is of the terminal and that is determined in S202 to the terminal.

S204. After receiving the data reporting time sent by the Internet of things platform, the terminal reports data to the Internet of things platform based on the data reporting time.

In this embodiment, the terminal receives the data reporting time sent by the Internet of things platform, and then reports the data to the Internet of things platform based on the data reporting time. For example, the terminal reports the data to the Internet of things platform when the data reporting time arrives.

In this embodiment, the Internet of things platform determines the data reporting time of the terminal based on the historical load of the serving cell, and sends the data reporting time to the terminal, and the terminal reports the data to the Internet of things platform based on the data reporting time received from the Internet of things platform. In this embodiment, the data reporting time of the terminal is determined based on the historical load of the serving cell. Therefore, the determined data reporting time may be, for example, the time at which the load of the serving cell is the lowest. Therefore, the terminal may report data at staggered times such that a large quantity of terminals can be prevented from performing reporting at a same time, network congestion is avoided, and a network use rate and a success rate of data reporting are improved.

In some embodiments, a possible implementation of S202 includes the Internet of things platform determines predicted load of the serving cell in a preset period of time from the current time based on the historical load of the serving cell, and then determines the data reporting time of the terminal based on the predicted load of the serving cell in the preset period of time from the current time. In this embodiment, after obtaining the historical load of the serving cell, the Internet of things platform determines the predicted load of the serving cell in the preset period of time from the current time based on the historical load of the serving cell. For example, predicted load of the serving cell in each minute within two days from the current time may be determined. Then, the Internet of things platform determines the data reporting time of the terminal based on the obtained predicted load. For example, the data reporting time may be a time at which the predicted load is the lowest.

In some embodiments, a possible implementation of the obtaining, by an Internet of things platform, historical load of a serving cell includes the platform obtains historical load of at least one cell, where the at least one cell includes the serving cell of the terminal, and then the Internet of things platform obtains the historical load of the serving cell from the historical load of the at least one cell based on the serving cell of the terminal. Optionally, the Internet of things platform may further receive information that is about the serving cell of the terminal and that is sent by the terminal such that the Internet of things platform may determine the serving cell of the terminal.

The following describes an implementation in which the Internet of things platform obtains the historical load of the at least one cell, but this embodiment is not limited thereto.

Figure 3:
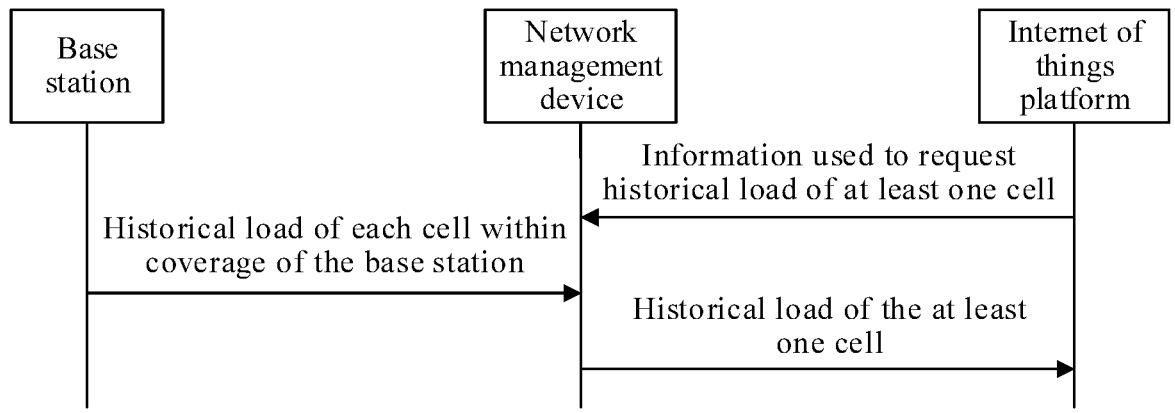
FIG. 3 is a schematic diagram of obtaining historical load of at least one cell by an Internet of things platform according to an embodiment of this application.

In a possible implementation, the Internet of things platform obtains the historical load of the at least one cell from a network management device. For example, as shown in FIG. 3, an interface is newly added between the Internet of things platform and the network management device. The Internet of things platform may send, to the network management device using the newly added interface, information used to request the historical load of the at least one cell (for example, the Internet of things platform may request historical load of each cell managed by the network management device, or may request information about historical load of at least one specified cell, or may request information about historical load of each cell covered by a specified base station). In addition, the base station may periodically report historical load of each cell within coverage of the base station to the network management device. Therefore, after the network management device receives the information that is sent by the Internet of things platform and that is used to request the historical load of the at least one cell, the network management device sends, to the Internet of things platform using the newly added interface, the historical load of the at least one cell that is received from the base station.

Figure 4:
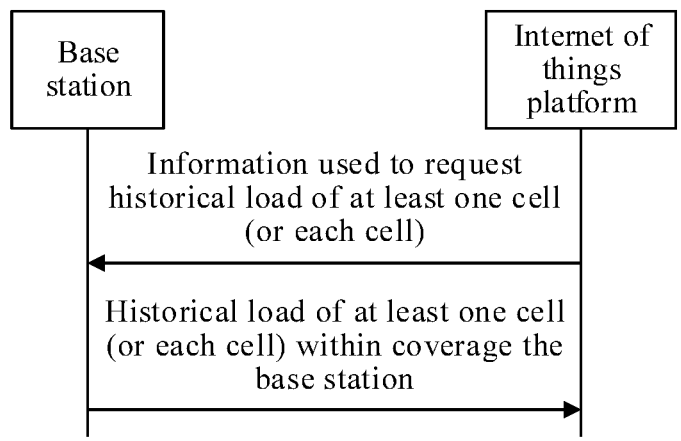
FIG. 4 is a schematic diagram of obtaining historical load of at least one cell by an Internet of things platform according to another embodiment of this application.

In another possible implementation, the Internet of things platform obtains the historical load of the at least one cell from the base station, and the at least one cell is a cell within coverage of the base station. For example, as shown in FIG. 4, an interface is newly added between the Internet of things platform and the base station. The Internet of things platform may send, to the base station using the newly added interface, information used to request the historical load of the at least one cell (for example, the Internet of things platform may request historical load of each cell within coverage of the base station, or may request historical load of at least one specified cell within coverage of the base station). Then, the base station reports the historical load of each cell (or the at least one specified cell) within coverage of the base station to the Internet of things platform using the newly added interface.

In another possible implementation, that the Internet of things platform obtains the historical load of the at least one cell from an SCEF may be the Internet of things platform sends a first message to the SCEF, where the first message includes information used to request the historical load, identification information of the at least one cell, and/or identification information of the base station, in other words, the first message includes the information used to request the historical load and the identification information of the at least one cell, or the first message includes the information used to request the historical load and the identification information of the base station, or the first message includes the information used to request the historical load, the identification information of the at least one cell, and the identification information of the base station, the base station is a serving base station of the terminal, and the at least one cell is a cell within coverage of the base station, and then, the SCEF sends the historical load of the at least one cell to the Internet of things platform. Optionally, the information used to request the historical load may be a message type in the first message. In this embodiment, the first message may request the historical load using the message type, to reduce a size of the first message.

Figure 5:
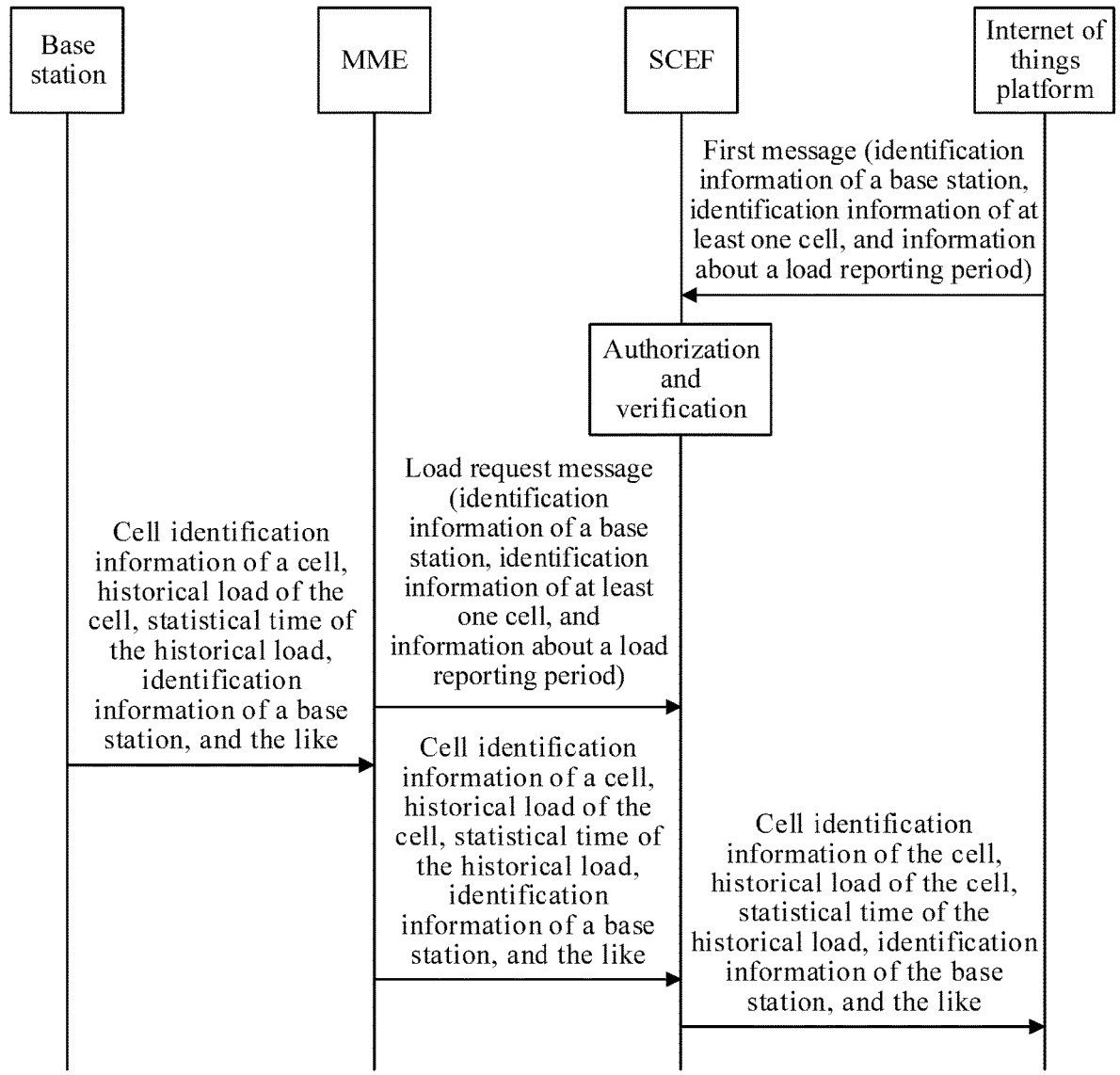
FIG. 5 is a schematic diagram of obtaining historical load of at least one cell by an Internet of things platform according to another embodiment of this application.

For example, as shown in FIG. 5, an interface is newly added between the Internet of things platform and the SCEF. The Internet of things platform may send the first message to the SCEF using the newly added interface. The first message includes the information used to request the historical load. In addition, the first message may include identification information of the base station (used to indicate historical load of a cell within coverage of a specified base station) and/or identification information of the at least one cell (used to request historical load of at least one specified cell). Optionally, the first message may further include information about a load reporting period (if the historical load is periodically reported, the information needs to be included). After receiving the first message, the SCEF performs authorization and verification to verify whether the platform has a right to request the historical load. If it is verified that the platform has the right to request the historical load, the SCEF sends a load request message to a Mobility Management Entity (MME). The load request message includes the identification information of the base station and/or the identification information of the at least one cell. Optionally, the load request message may further include the information about the load reporting period. Then, the MME sends the load request message to the base station. After receiving the load request message sent by the MME, the base station may send the historical load of each cell of the base station or the historical load of the at least one cell to the MME, or the base station sends the historical load to the MME based on the load reporting period. Specifically, the base station may send identification information of a cell, historical load of the cell, a statistics collection time of the historical load, the identification information of the base station, and the like to the MME. Then, the MME forwards the identification information of the cell, the historical load of the cell, the statistics collection time of the historical load, the identification information of the base station, and the like to the SCEF, and the SCEF forwards the identification information of the cell, the historical load of the cell, the statistics collection time of the historical load, the identification information of the base station, and the like to the Internet of things platform.

Optionally, the historical load obtained by the Internet of things platform from the base station, the network management device, or the SCEF is the historical load in the period of time before the current time. A size of the period of time may be indicated by the Internet of things platform to the base station, the network management device, or the SCEF.

Figure 6:
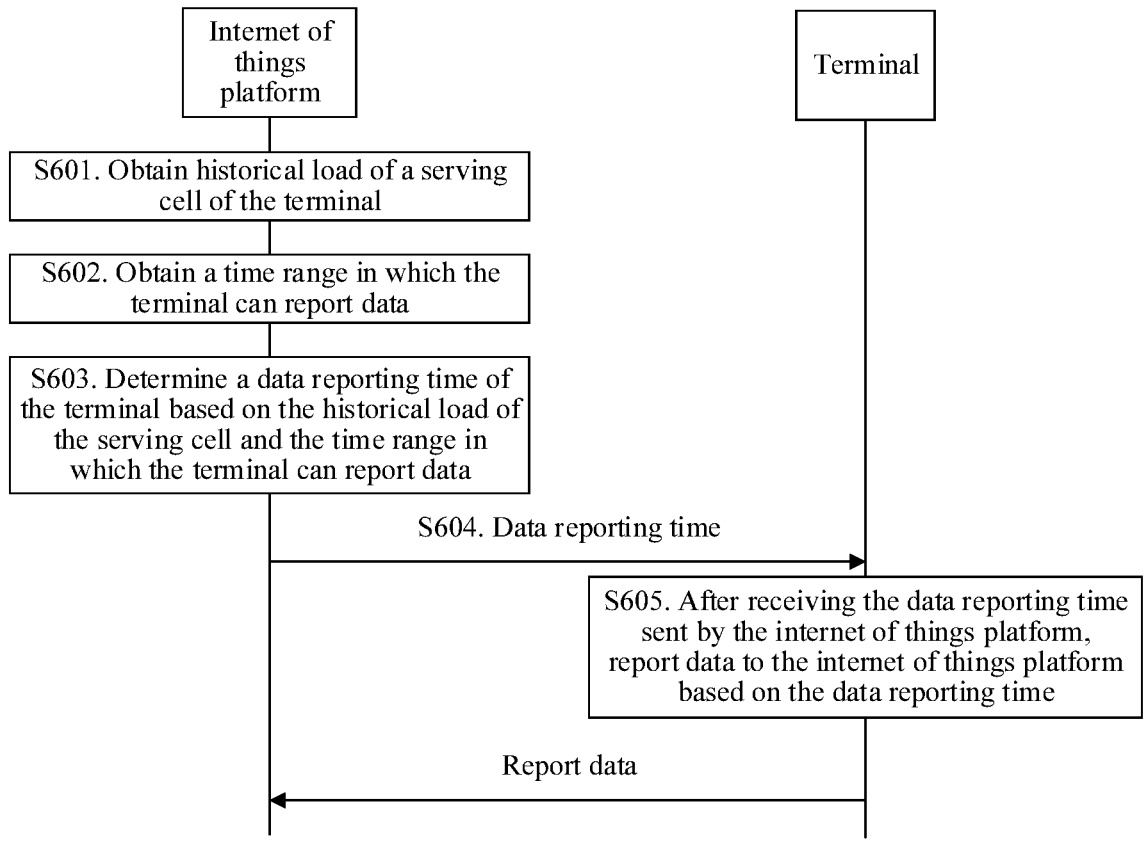
FIG. 6 is a flowchart of a communication method according to another embodiment of this application.

FIG. 6 is a flowchart of a communication method according to another embodiment of this application. As shown in FIG. 6, the method in this embodiment may include the following steps.

S601. An Internet of things platform obtains historical load of a serving cell of a terminal.

In this embodiment, for a specific implementation process of S601, refer to related descriptions in the embodiment shown in FIG. 2. Details are not described herein again.

S602. The Internet of things platform obtains a time range in which the terminal can report data.

In this embodiment, the Internet of things platform further obtains the time range in which the terminal can report data. The time range in which data can be reported is a time range in which the terminal can report data to the Internet of things platform, and indicates that the terminal reports data in this time range. For example, the time range is 9:00 to 11:00.

An execution sequence of S601 and S602 is not limited.

S603. The Internet of things platform determines a data reporting time of the terminal based on the historical load of the serving cell and the time range in which the terminal can report data.

In this embodiment, after obtaining the historical load of the serving cell of the terminal and the time range in which the terminal can report data, the Internet of things platform determines the data reporting time of the terminal based on the historical load of the serving cell and the time range in which the terminal can report data. In some embodiments, the Internet of things platform determines, based on the historical load of the serving cell, the data reporting time from the time range in which data can be reported. For example, a time at which load of the serving cell is the lowest is determined as the data reporting time from the time range in which data can be reported, and the data reporting time is, for example, a moment in the time range in which data can be reported, or the data reporting time of the terminal is, for example, partial time in the time range in which data can be reported.

In some embodiments, the Internet of things platform determines predicted load of the serving cell in a preset period of time from a current time based on the historical load of the serving cell, and then determines the data reporting time of the terminal based on the predicted load of the serving cell in the preset period of time from the current time and the time range in which data can be reported.

S604. The Internet of things platform sends the data reporting time to the terminal.

S605. After receiving the data reporting time sent by the Internet of things platform, the terminal reports data to the Internet of things platform based on the data reporting time.

In this embodiment, for a specific implementation process of S604 and S605, refer to related descriptions in the embodiment shown in FIG. 2. Details are not described herein again.

In this embodiment, the Internet of things platform determines the data reporting time of the terminal based on the historical load of the serving cell and the time range in which the terminal can report data, and sends the data reporting time of the terminal to the terminal, and the terminal reports the data to the Internet of things platform based on the data reporting time received from the Internet of things platform. In this embodiment, the data reporting time of the terminal is determined based on the historical load of the serving cell and the time range in which the terminal can report data. Therefore, the determined data reporting time may be, for example, the time at which the load of the serving cell is the lowest in the time range in which data can be reported. Therefore, the terminal may report data at staggered times such that a large quantity of terminals can be prevented from performing reporting at a same time, network congestion is avoided, and a network use rate and a success rate of data reporting are improved.

The following describes an implementation in which the Internet of things platform obtains the time range in which the terminal can report data in S602, but this embodiment is not limited thereto.

Figure 7:
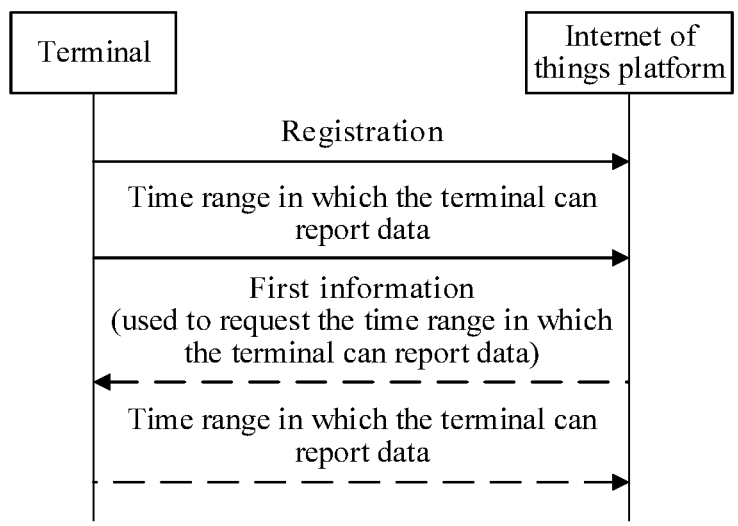
FIG. 7 is a schematic diagram of obtaining, by an Internet of things platform, a time range in which data can be reported according to an embodiment of this application.

In a possible implementation, the Internet of things platform receives the time range that is sent by the terminal and in which the terminal can report data. The terminal may actively send, to the Internet of things platform, the time range in which the terminal can report data. For example, as shown in FIG. 7, when registering with the Internet of things platform or after registering with the Internet of things platform, the terminal sends, to the Internet of things platform using another message, the time range in which the terminal can report data. It should be noted that, in FIG. 7, after registering with the Internet of things platform, the terminal actively sends, to the Internet of things platform, the time range in which the terminal can report data. In another example, the terminal may also add, to a registration message, the time range in which data can be reported, and send the registration message to the Internet of things platform. Alternatively, the Internet of things platform may first request to obtain, from the terminal, the time range in which the terminal can report data, and then the terminal sends, to the Internet of things platform, the time range in which the terminal can report data. For example, after the terminal registers with the Internet of things platform, the Internet of things platform sends first information to the terminal, where the first information is used to request the time range in which the terminal can report data, and after receiving the first information, the terminal sends, to the Internet of things platform, the time range in which the terminal can report data.

In another possible implementation, that the Internet of things platform receives a time range that is sent by an application server and in which the terminal can report data may be further the Internet of things platform receives a time range that is sent by the application server and corresponds to a service type of the terminal and in which data can be reported, where the time range that corresponds to the service type of the terminal and in which data can be reported is the time range in which the terminal can report data. For example, the Internet of things platform receives a time range that is sent by the application server and corresponds to a first service type and in which data can be reported, and the Internet of things platform determines, based on a fact that the service type of the terminal is the first service type, that the time range that corresponds to the first service type and in which data can be reported is the time range in which the terminal can report data.

Optionally, the application server may further send second information to the Internet of things platform, where the second information is used to indicate a service type provided by the application server, and the service type of the terminal is the same as the service type provided by the application server. Because the second information indicates the service type provided by the application server, the Internet of things platform may determine that the time range that is received from the application server and in which data can be reported is the time range in which the terminal can report data. In some solutions, the application server may send, to the Internet of things platform using a same message, the second information and the time range that corresponds to the service type of the terminal and in which data can be reported, or may send, to the Internet of things platform using different messages, the second information and the time range that corresponds to the service type of the terminal and in which data can be reported.

Figure 8:
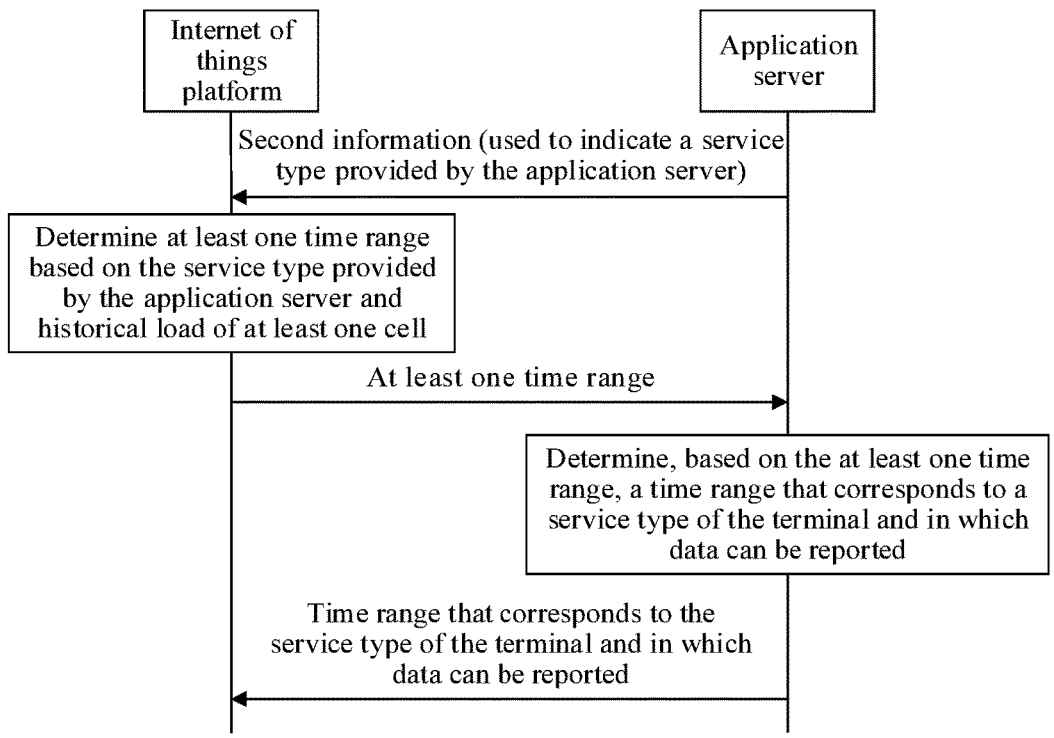
FIG. 8 is a schematic diagram of obtaining, by an Internet of things platform, a time range in which data can be reported according to another embodiment of this application.

Optionally, before the application server sends, to the Internet of things platform, the time range that corresponds to the service type of the terminal and in which data can be reported, the application server may further send second information to the Internet of things platform, where the second information is used to indicate a service type provided by the application server, and the service type of the terminal is the same as the service type provided by the application server. After receiving the second information, the Internet of things platform determines at least one time range based on the service type provided by the application server and historical load of at least one cell, where the at least one time range may be, for example, a time range in which load is less than preset load. Then, the Internet of things platform sends the determined at least one time range to the application server. After receiving the at least one time range, the application server determines, from the at least one time range, the time range that corresponds to the service type of the terminal and in which data can be reported, and sends the time range to the Internet of things platform, for example, as shown in FIG. 8.

The foregoing service type indicates an industry to which the service belongs, for example, periodic reporting of a meter and the like, periodic registration of a street lamp, periodic data reporting of a shared bicycle, periodic data reporting of a smart home appliance, or event reporting of a smart home appliance.

Based on the foregoing embodiments, optionally, the terminal further sends information about the serving cell of the terminal to the Internet of things platform. Correspondingly, the Internet of things platform receives the information about the serving cell of the terminal. The terminal may actively send the information about the serving cell of the terminal to the Internet of things platform. For example, the terminal sends the information about the serving cell of the terminal to the Internet of things platform when registering with the Internet of things platform. Alternatively, the Internet of things platform may first request to obtain the information about the serving cell of the terminal from the terminal, and then the terminal sends the information about the serving cell of the terminal to the Internet of things platform. For example, after the terminal registers with the Internet of things platform, the Internet of things platform sends information used to request to obtain the serving cell of the terminal to the terminal, and after receiving the information used to request to obtain the serving cell of the terminal, the terminal sends the information about the serving cell of the terminal to the Internet of things platform. Optionally, the terminal may send, to the Internet of things platform using a same message, the information about the serving cell of the terminal and the time range in which the terminal can report data. Optionally, the Internet of things platform may request, using a same message, to obtain, from the terminal, the information about the serving cell of the terminal and the time range in which the terminal can report data.

Based on the foregoing embodiments, optionally, the terminal further sends a reporting type of the terminal to the Internet of things platform, where the reporting type is used to indicate that a data reporting type of the terminal is periodic reporting or event-triggered reporting. Correspondingly, the Internet of things platform receives the reporting type of the terminal. The terminal may actively send the reporting type of the terminal to the Internet of things platform. For example, the terminal sends the reporting type of the terminal to the Internet of things platform when registering with the Internet of things platform. Alternatively, the Internet of things platform may first request to obtain the reporting type of the terminal from the terminal, and then the terminal sends the reporting type of the terminal to the Internet of things platform. For example, after the terminal registers with the Internet of things platform, the Internet of things platform sends information used to request to obtain the reporting type of the terminal to the terminal, and after receiving the information used to request to obtain the reporting type of the terminal, the terminal sends information about the reporting type of the terminal to the Internet of things platform.

At least two of the time range in which the terminal can report data, the information about the serving cell of the terminal, and the reporting type of the terminal may be included in a same message and are sent by the terminal to the Internet of things platform, or may be separately included in different messages and are sent by the terminal to the Internet of things platform.

In some embodiments, the terminal may send the information about the serving cell of the terminal and the reporting type of the terminal to the Internet of things platform during registration, and the information may be included in, for example, a schedule object. After the terminal completes registration, the Internet of things platform requests the serving cell of the terminal and the reporting type of the terminal from the terminal, and then the terminal sends the information about the serving cell of the terminal and the reporting type of the terminal to the Internet of things platform.

Figure 9:
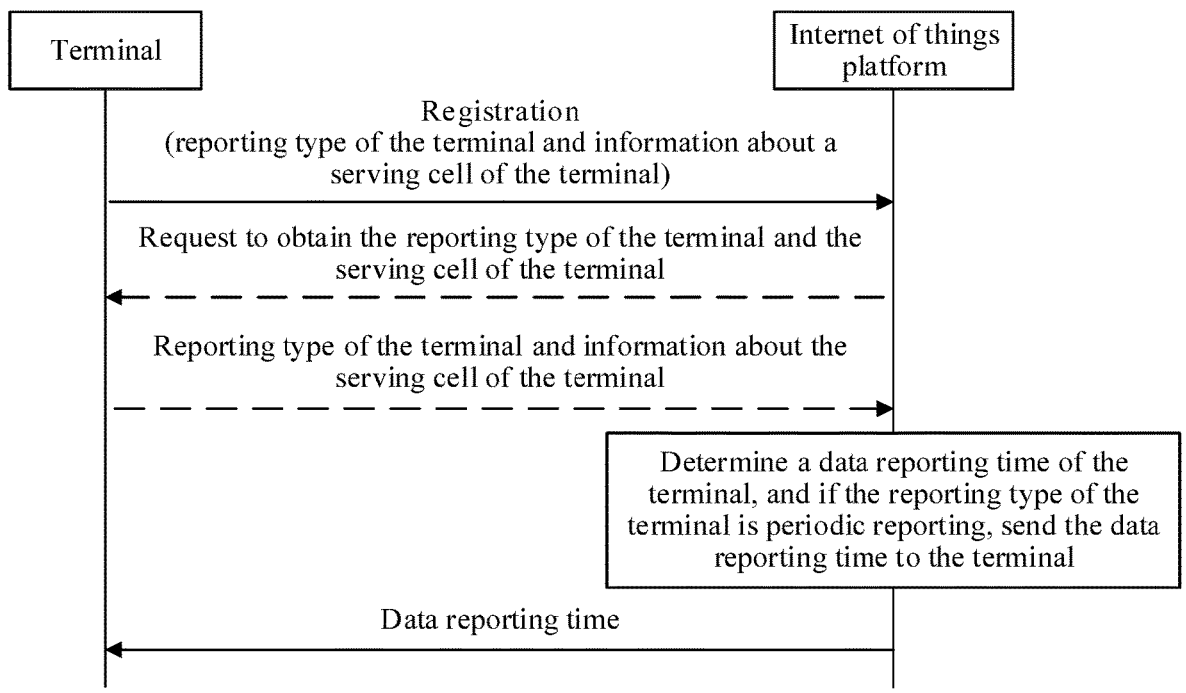
FIG. 9 is a schematic diagram of application to periodic reporting according to an embodiment of this application.

If the reporting type of the terminal is periodic reporting, and the periodic reporting includes but is not limited to, if a terminal such as a gas meter or a water meter reports read data once a day, all street lamps are powered on at, for example, 6 p.m., and registration of a device is triggered after all the street lamps are powered on, the Internet of things platform determines the data reporting time of the terminal in the manners described in the foregoing embodiments, and sends the data reporting time to the terminal, for example, as shown in FIG. 9.

Figure 10:
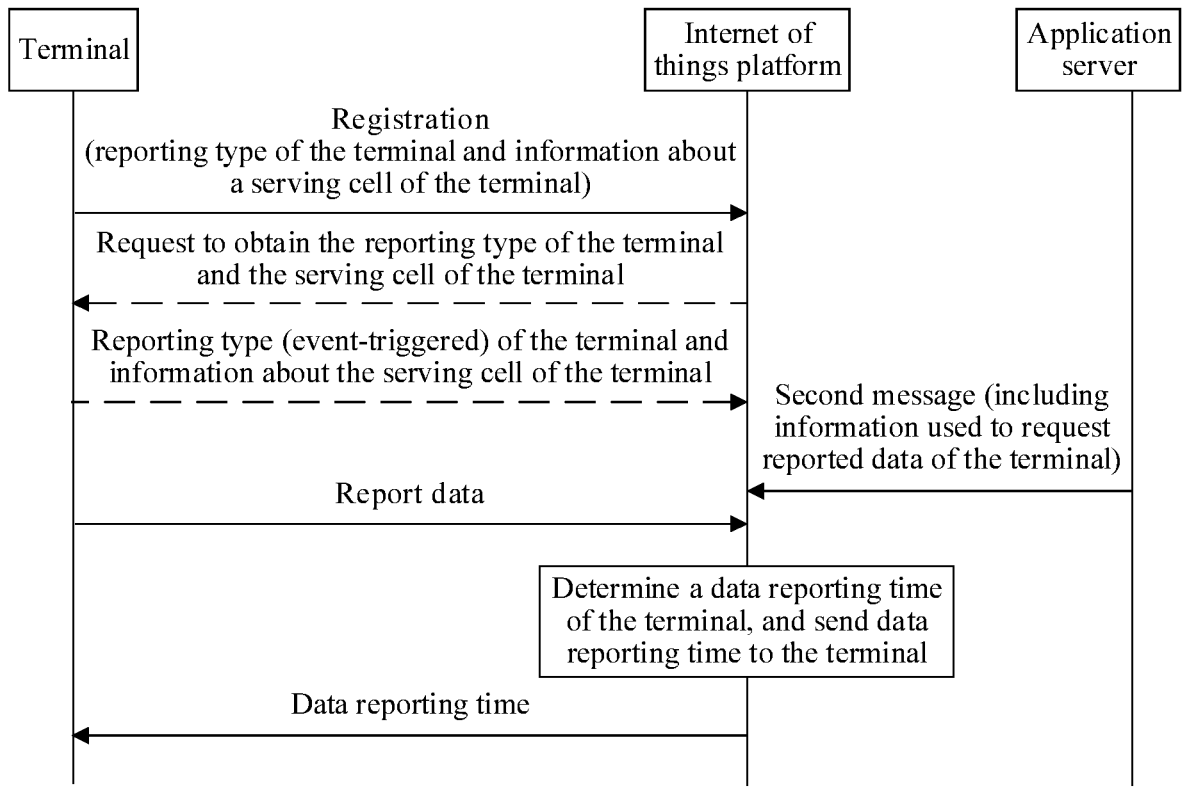
FIG. 10 is a schematic diagram of application to event-triggered reporting according to an embodiment of this application.

If the reporting type of the terminal is event-triggered reporting, for example, when a client needs to read data of a batch of terminals, a read command is delivered in advance, and the read command triggers the terminal to report data. In this case, the Internet of things platform first does not determine the data reporting time of the terminal, and then determines the data reporting time after waiting for event triggering. For example, when the Internet of things platform receives a second message sent by the application server, if the second message includes information used to request data reported by the terminal, it indicates that event triggering occurs and then the data reporting time of the terminal can be determined. Optionally, the second message may further include identification information of a cell or identification information of a group. If the second message includes the identification information of the cell, it indicates that the second message requests the serving cell to report data for a terminal in the cell. If the second message includes the identification information of the group, it indicates that the second message requests data reported by a terminal in the group. In some embodiments, after detecting that the terminal is connected to the Internet of things platform, the Internet of things platform determines the data reporting time of the terminal in the manners described in the foregoing embodiments, and sends the data reporting time to the terminal. For example, the Internet of things platform may add the data reporting time to a response message and send the response message to the terminal. That the Internet of things platform detects that the terminal is connected to the Internet of things platform may be, when the Internet of things platform receives data reported by the terminal, the Internet of things platform detects that the terminal is connected to the Internet of things platform, for example, as shown in FIG. 10.

In some embodiments, the terminal further sends a quantity of reporting times to the Internet of things platform, where the quantity of reporting times may be N, and N may be equal to 1 or may be an integer greater than 1. The quantity of reporting times may be included in a same message (for example, included in a schedule object) with the foregoing information about the serving cell of the terminal and the foregoing reporting period of the terminal, and may be sent by the terminal to the Internet of things platform, or may be sent by the terminal to the Internet of things platform using different messages. Optionally, the Internet of things platform further sends, to the terminal, information used to request the quantity of reporting times, and then the terminal sends the quantity of reporting times to the Internet of things platform. If the quantity of reporting times is N (N is greater than 1), there may be N data reporting times of the terminal that can be determined by the Internet of things platform in this embodiment. Optionally, there may be one or M time ranges in which the terminal can report data, where M is less than or equal to N. This is not limited in this embodiment.

In some embodiments, the Internet of things platform may update (or modify) the data reporting time of the terminal.

Figure 11:
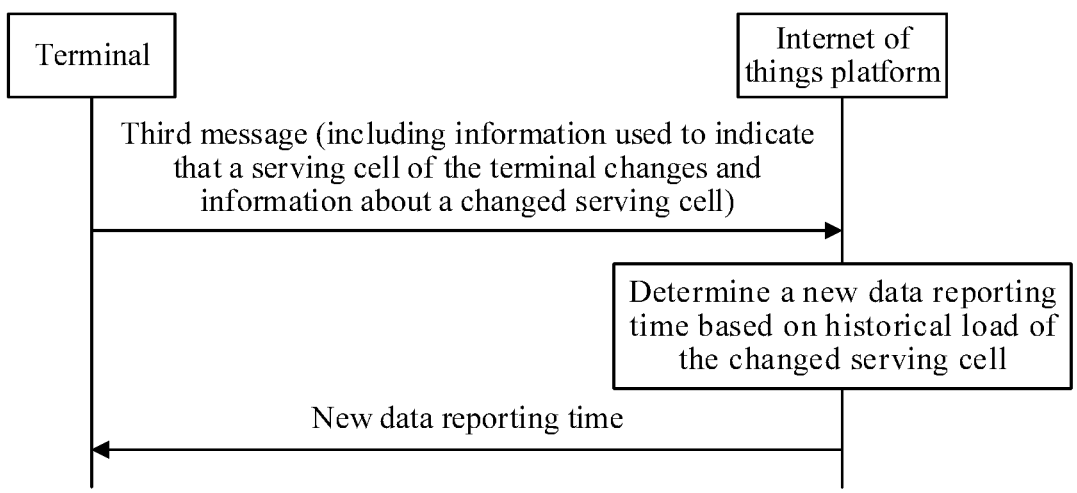
FIG. 11 is a schematic diagram of updating a data reporting time by an Internet of things platform according to an embodiment of this application.

In a possible implementation, a change of the serving cell of the terminal triggers the Internet of things platform to update the data reporting time of the terminal. For example, as shown in FIG. 11, after the serving cell of the terminal changes, the terminal sends a third message to the Internet of things platform, where the third message includes information used to indicate that the serving cell of the terminal changes and information about a changed serving cell. Then, the Internet of things platform obtains historical load of the changed serving cell, determines a new data reporting time based on the historical load of the changed serving cell, and then sends the new data reporting time to the terminal. Then, the terminal reports data to the Internet of things platform based on the new data reporting time.

Figure 12:
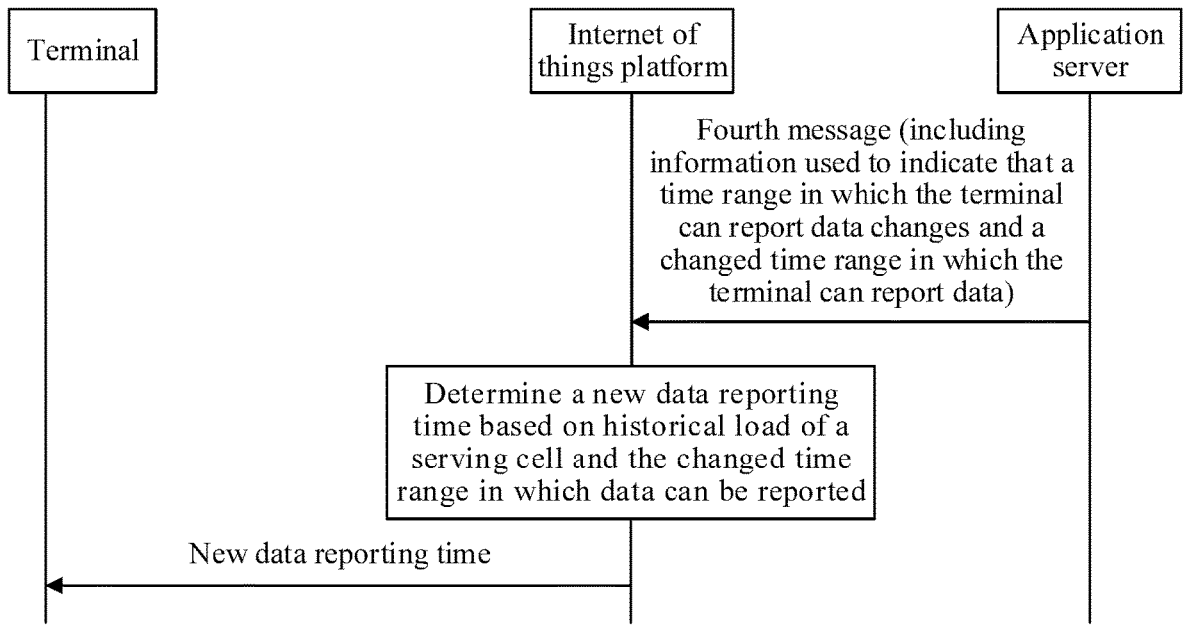
FIG. 12 is a schematic diagram of updating a data reporting time by an Internet of things platform according to another embodiment of this application.

In another possible implementation, a change of the time range in which the terminal can report data triggers the Internet of things platform to update the data reporting time of the terminal. For example, as shown in FIG. 12, after the time range in which the terminal can report data changes, the application server or the terminal (it should be noted that the application server is shown as an example in FIG. 12) sends a fourth message to the Internet of things platform, where the fourth message includes information used to indicate that the time range in which the terminal can report data changes and a changed time range in which data can be reported. Then, the Internet of things platform obtains the historical load of the serving cell (it should be noted that, as time passes by, the currently obtained historical load of the serving cell may be different from the historical load of the serving cell obtained in S201), determines a new data reporting time based on the historical load of the serving cell and a changed time range in which data can be reported, and then sends the new data reporting time to the terminal. Then, the terminal reports data to the Internet of things platform based on the new data reporting time.

Figure 13:
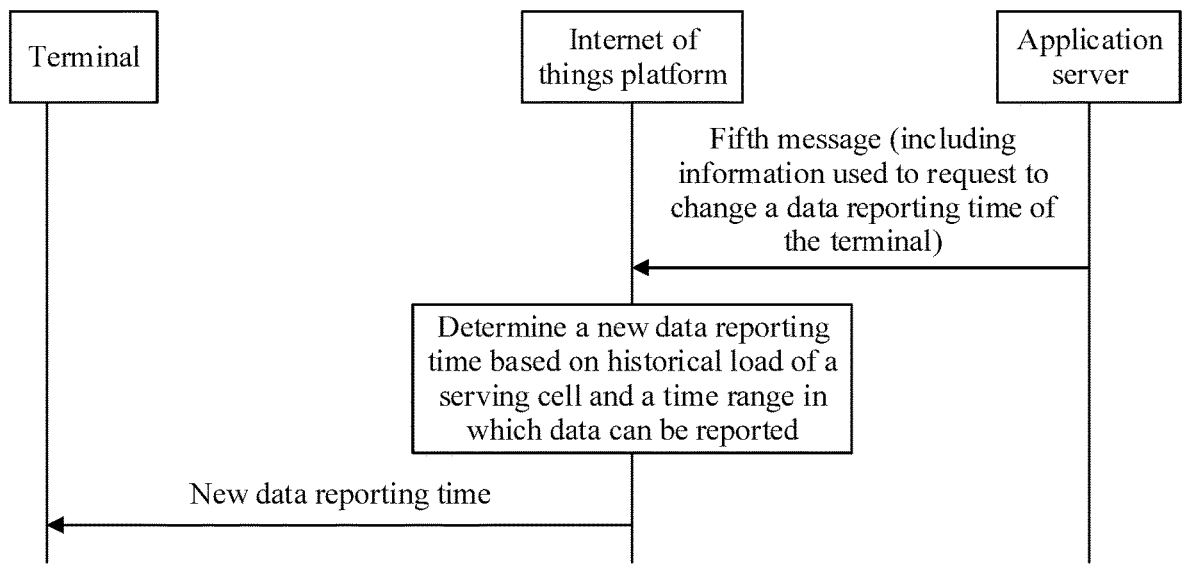
FIG. 13 is a schematic diagram of updating a data reporting time by an Internet of things platform according to another embodiment of this application.

In another possible implementation, the application server or the terminal may actively request the Internet of things platform to update the data reporting time of the terminal. For example, as shown in FIG. 13, the application server or the terminal (it should be noted that the application server is shown as an example in FIG. 13) sends a fifth message to the Internet of things platform, where the fifth message includes information used to instruct to change the data reporting time of the terminal. Then, the Internet of things platform obtains the historical load of the serving cell (it should be noted that, as time passes by, the currently obtained historical load of the serving cell may be different from the historical load of the serving cell obtained in S201), determines a new data reporting time based on the historical load of the serving cell and a changed time range in which data can be reported, and then sends the new data reporting time to the terminal. Then, the terminal reports data to the Internet of things platform based on the new data reporting time.

In some embodiments, before executing the solutions in the foregoing embodiments, the Internet of things platform determines that the terminal supports data reporting performed at a data reporting time that is set by the Internet of things platform. In this embodiment, the Internet of things platform executes the solution in any one of the foregoing embodiments only after determining that the terminal supports data reporting performed at the data reporting time that is set by the Internet of things platform. If the Internet of things platform determines that the terminal supports data reporting that is not performed at the data reporting time that is set by the Internet of things platform, the Internet of things platform does not execute the solution in any one of the foregoing embodiments.

Optionally, the terminal further sends third information to the Internet of things platform, where the third information is used to indicate that the terminal can report data at a data reporting time that is set by the Internet of things platform. After receiving the third information, the Internet of things platform determines, based on the third information, that the terminal supports data reporting performed at the data reporting time that is set by the Internet of things platform, and then the Internet of things platform executes the solutions in the foregoing embodiments. In some embodiments, the third information is, for example, a schedule object. Therefore, if the Internet of things platform in this embodiment receives the schedule object sent by the terminal, it can be determined that the terminal supports data reporting performed at the data reporting time that is set by the Internet of things platform.

In some embodiments, a data reporting time field, a reporting period field, a reporting quantity field, a field of the time range in which data can be reported, the reporting quantity field, and a reporting type field in the foregoing embodiments may be carried using the schedule object. For example, the schedule object includes content shown in the following Table 1.

TABLE 1

| Identifier (ID) | Name (Name) | Operations | Instance (Instances) | Mandatory (Mandatory) | Type (Type) | Range or enumeration (Range or Enumeration) | Units | Description (Description) |
|---|---|---|---|---|---|---|---|---|
| 0 | Data reporting time (Report Time) | | A plurality of (multiple) | Mandatory (Mandatory) | Integer (Integer) | | | Data reporting time (may be an absolute time or a relative time), where there are a plurality of instances for the report time when reporting is performed a plurality of times every day |
| 1 | Reporting period (Report Cycle) | | One (single) | Mandatory (Mandatory) | String (String) | | | Reporting period (0 indicates reporting only once) |
| 2 | Quantity of reporting times (Report Num) | | One (single) | Optional (Optional) | Integer (Integer) | | | Quantity of reporting times every day, which corresponds to the report time, for example, if reporting is performed three times every day, three instances of the report time are required to record the data reporting time |
| 3 | Time range in which data can be reported (Report Tolerance cycle) | | One (single) | Mandatory (Mandatory) | String (String) | | | Time range in which data can be reported, where a current value can be read from a terminal |
| 4 | Reporting type (Report Type) | | One (single) | Mandatory (Mandatory) | Integer (Integer) | | | Reporting type: 0 indicates periodic report, 1 indicates event-triggered (such as, query), and 2 indicates timed registration |

Figure 14:
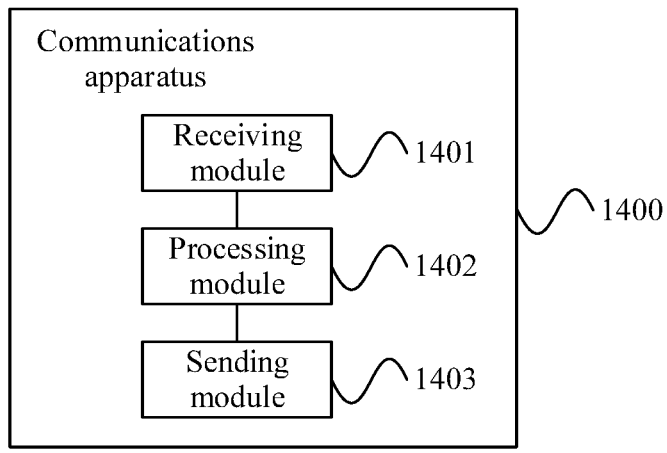
FIG. 14 is a schematic structural diagram of a communications device according to an embodiment of this application.

FIG. 14 is a schematic structural diagram of a communications device according to an embodiment of this application. As shown in FIG. 14, the communications apparatus may be an Internet of things platform, may be a component (for example, an integrated circuit or a chip) of an Internet of things platform, or may be another module, and is configured to implement operations corresponding to the Internet of things platform in any one of the foregoing method embodiments. The communications apparatus 1400 in this embodiment may include a receiving module 1401, a processing module 1402, and a sending module 1403.

The receiving module 1401 is configured to obtain historical load of a serving cell of a terminal.

The processing module 1402 is configured to determine data reporting time of the terminal based on the historical load of the serving cell.

The sending module 1403 is configured to send the data reporting time to the terminal.

In some embodiments, the processing module 1402 is further configured to determine predicted load of the serving cell in a preset time period from a current time based on the historical load of the serving cell, and determine the data reporting time of the terminal based on the predicted load of the serving cell in the preset time period from the current time.

In some embodiments, the receiving module 1401 is further configured to obtain historical load of at least one cell, where the at least one cell includes the serving cell of the terminal, and obtain the historical load of the serving cell from the historical load of the at least one cell based on the serving cell of the terminal.

In some embodiments, the receiving module 1401 is further configured to obtain the historical load of the at least one cell from a network management device.

In some embodiments, the receiving module 1401 is further configured to obtain the historical load of the at least one cell from a base station, where the base station is a serving base station of the terminal, and the at least one cell is a cell within coverage of the base station.

In some embodiments, the receiving module 1401 is further configured to obtain the historical load of the at least one cell from an SCEF.

In some embodiments, the sending module 1403 is further configured to send a first message to the SCEF before the receiving module receives identification information that is of the at least one cell and that is sent by the SCEF, where the first message includes information used to request the historical load, the identification information of the at least one cell, and/or identification information of a base station, where the base station is a serving base station of the terminal, and the at least one cell is a cell within coverage of the base station.

In some embodiments, the receiving module 1401 is further configured to obtain a time range in which the terminal can report data.

The processing module 1402 is further configured to determine the data reporting time of the terminal based on the historical load of the serving cell and the time range in which data can be reported.

In some embodiments, the receiving module 1401 is further configured to receive the time range that is sent by the terminal and in which data can be reported.

In some embodiments, the sending module 1403 is further configured to send first information to the terminal, where the first information is used to request the time range in which data can be reported.

In some embodiments, the receiving module 1401 is further configured to receive a time range that is sent by an application server and corresponds to a service type of the terminal and in which data can be reported, and determine, as the time range in which the terminal can report data, the time range that corresponds to the service type of the terminal and in which data can be reported.

In some embodiments, the receiving module 1401 is further configured to receive first information sent by the application server, where the first information is used to indicate a service type provided by the application server, and the service type provided by the application server is the same as the service type of the terminal.

The processing module 1402 is further configured to determine at least one time range based on the service type provided by the application server and the historical load of the at least one cell.

The sending module 1403 is further configured to send the at least one time range to the application server, where the at least one time range is used by the application server to determine, based on the at least one time range, the time range that corresponds to the service type of the terminal and in which data can be reported.

In some embodiments, the receiving module 1401 is further configured to receive information that is about the serving cell of the terminal and that is sent by the terminal.

In some embodiments, the sending module 1403 is further configured to send information used to request to obtain the serving cell of the terminal to the terminal.

In some embodiments, the receiving module 1401 is further configured to receive a reporting type of the terminal that is sent by the terminal, where the reporting type is used to indicate that a data reporting type of the terminal is periodic reporting or event-triggered reporting.

In some embodiments, the sending module 1403 is further configured to send information used to request the reporting type of the terminal to the terminal.

In some embodiments, if the reporting type of the terminal is event-triggered reporting, the receiving module 1401 is further configured to receive a second message sent by the application server, where the second message includes information used to request data reported by the terminal.

In some embodiments, the processing module 1402 is further configured to, after detecting that the terminal is connected to the Internet of things platform, determine the data reporting time of the terminal based on the historical load of the serving cell.

In some embodiments, the receiving module 1401 is further configured to, after the sending module sends the data reporting time to the terminal, receive a third message sent by the terminal, where the third message includes information used to indicate that the serving cell of the terminal changes and information about the changed serving cell.

The processing module 1402 is further configured to update the data reporting time of the terminal based on historical load of the changed serving cell.

In some embodiments, the receiving module 1401 is further configured to, after the sending module 1403 sends the data reporting time to the terminal, receive a fourth message sent by the application server or the terminal, where the fourth message includes information used to indicate that the time range in which the terminal can report data changes and the changed time range in which data can be reported.

The processing module 1402 is further configured to update the data reporting time of the terminal based on the historical load of the serving cell and the changed time range in which data can be reported.

In some embodiments, the receiving module 1401 is further configured to, after the sending module 1403 sends the data reporting time to the terminal, receive a fifth message sent by the application server or the terminal, where the fifth message includes information used to instruct to change the data reporting time of the terminal.

The processing module 1402 is further configured to update the data reporting time of the terminal based on the historical load of the serving cell and the time range in which data can be reported.

In some embodiments, the processing module 1402 is further configured to, before the Internet of things platform executes any one of the foregoing solutions, determine that the terminal supports data reporting performed using a data reporting time that is set by the Internet of things platform.

In some embodiments, the receiving module 1401 is further configured to, before the processing module 1402 determines that the terminal supports data reporting performed using the data reporting time that is set by the Internet of things platform, receive third information sent by the terminal, where the third information is used to indicate that the terminal can report data at the data reporting time that is set by the Internet of things platform.

The apparatus in this embodiment may be configured to execute the technical solutions of the Internet of things platform the foregoing method embodiments. Their implementation principles and technical effects are similar, and are not described herein again.

Figure 15:
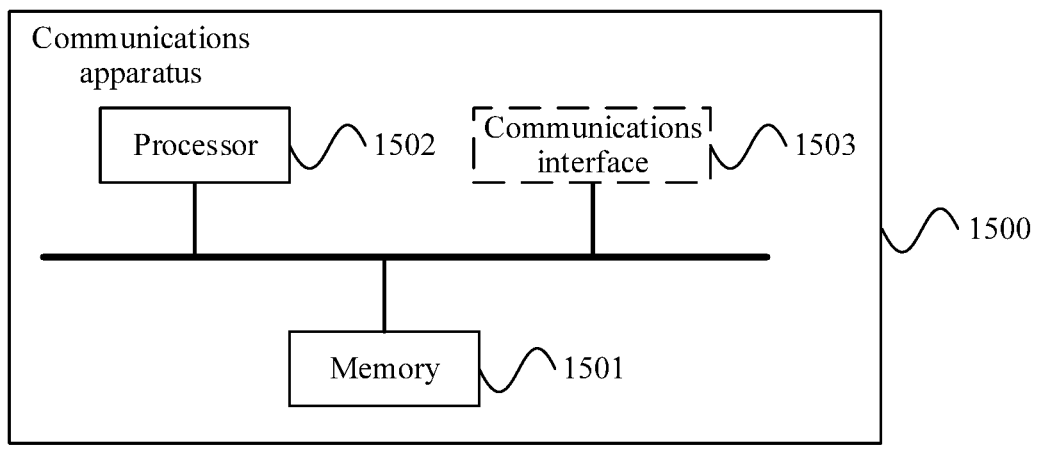
FIG. 15 is a schematic structural diagram of a communications apparatus according to another embodiment of this application.

FIG. 15 is a schematic structural diagram of a communications apparatus according to another embodiment of this application. As shown in FIG. 15, the communications apparatus may be an Internet of things platform, may be a component (for example, an integrated circuit or a chip) of an Internet of things, or may be another module, and is configured to implement operations corresponding to the Internet of things platform in any one of the foregoing method embodiments. The communications apparatus 1500 in this embodiment may include a memory 1501 and a processor 1502. The memory 1501 and the processor 1502 may be connected using a bus.

The memory 1501 is configured to store program code.

The processor 1502 invokes the program code, and when the program code is executed, is configured to perform the technical solution of the Internet of things platform in any one of the foregoing embodiments.

Optionally, this embodiment further includes a communications interface 1503. The communications interface 1503 may be connected to the processor 1502 using a bus. The processor 1502 may control the communications interface 1503 to implement the foregoing receiving and sending functions of the Internet of things platform.

The apparatus in this embodiment may be configured to execute the technical solutions of the Internet of things platform in the foregoing method embodiments. Their implementation principles and technical effects are similar, and are not described herein again.

Figure 16:
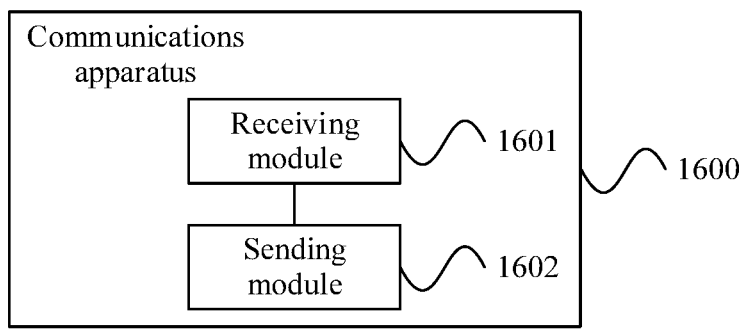
FIG. 16 is a schematic structural diagram of a communications apparatus according to another embodiment of this application.

FIG. 16 is a schematic structural diagram of a communications apparatus according to another embodiment of this application. As shown in FIG. 16, the communications apparatus may be a terminal, may be a component (for example, an integrated circuit or a chip) of the terminal, or may be another module, and is configured to implement operations corresponding to the terminal in any one of the foregoing method embodiments. The communications apparatus 1600 in this embodiment may include a receiving module 1601 and a sending module 1602.

The receiving module 1601 is configured to receive a data reporting time that is of the terminal and that is sent by an Internet of things platform.

The sending module 1602 is configured to report data to the Internet of things platform based on the data reporting time.

In some embodiments, the sending module is further configured to send, to the Internet of things platform, a time range in which the terminal can report data.

In some embodiments, the receiving module 1601 is further configured to, before the sending module 1602 sends the time range in which the terminal can report data to the Internet of things platform, receive first information sent by the Internet of things platform, where the first information includes information used to request a time range in which the terminal can report data.

In some embodiments, the sending module 1602 is further configured to send information about a serving cell of the terminal to the Internet of things platform.

In some embodiments, the receiving module 1601 is further configured to receive information that is used to request to obtain the serving cell of the terminal and that is sent by the Internet of things platform.

In some embodiments, the sending module 1602 is further configured to send a reporting type of the terminal to the Internet of things platform, where the reporting type is used to indicate that a data reporting type of the terminal is periodic reporting or event-triggered reporting.

In some embodiments, the receiving module 1601 is further configured to receive information that is used to request the reporting type of the terminal and that is sent by the Internet of things platform.

In some embodiments, the receiving module 1601 is further configured to receive updated data reporting time sent by the Internet of things platform.

The sending module 1602 is further configured to report data to the Internet of things platform based on the updated data reporting time.

In some embodiments, the sending module 1602 is further configured to send a third message to the Internet of things platform, where the third message includes information used to indicate that the serving cell of the terminal changes and information about the changed serving cell, or send a fourth message to the Internet of things platform, where the fourth message includes information used to indicate that the time range in which the terminal can report data changes and the changed time range in which data can be reported, or send a fifth message to the Internet of things platform, where the fifth message includes information used to instruct to change the data reporting time of the terminal.

In some embodiments, the sending module 1602 is further configured to send third information to the Internet of things platform, where the third information is used to indicate that the terminal can report data at a data reporting time that is set by the Internet of things platform.

The apparatus in this embodiment may be configured to execute the technical solutions of the terminal in the foregoing method embodiments. Their implementation principles and technical effects are similar, and are not described herein again.

Figure 17:
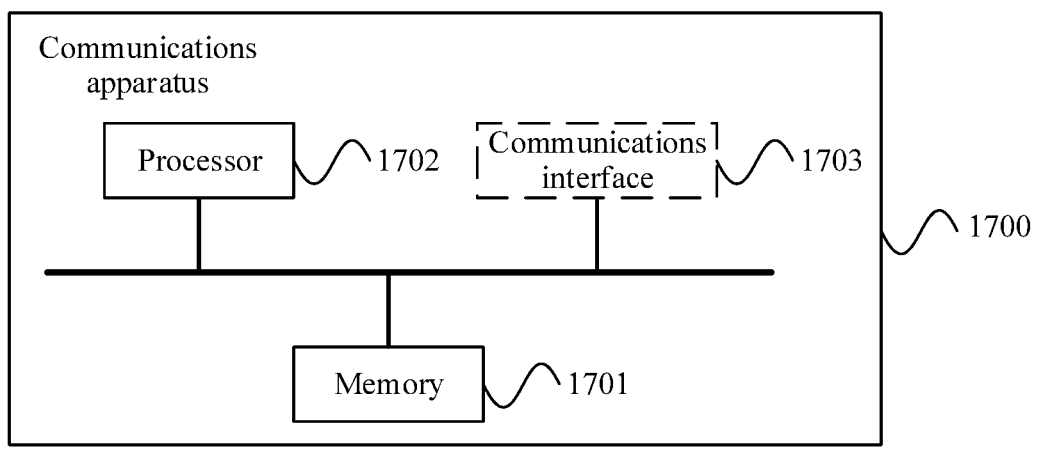
FIG. 17 is a schematic structural diagram of a communications apparatus according to another embodiment of this application.

FIG. 17 is a schematic structural diagram of a communications apparatus according to another embodiment of this application. As shown in FIG. 17, the communications apparatus may be a terminal, may be a component (for example, an integrated circuit or a chip) of a terminal, or may be another module, and is configured to implement operations corresponding to the terminal in any one of the foregoing method embodiments. The communications apparatus 1700 in this embodiment may include a memory 1701 and a processor 1702. The memory 1701 and the processor 1702 may be connected using a bus.

The memory 1701 is configured to store program code.

The processor 1702 invokes the program code, and when the program code is executed, is configured to perform the technical solution of the terminal in any one of the foregoing embodiments.

Optionally, this embodiment further includes a communications interface 1703. The communications interface 1703 may be connected to the processor 1702 using a bus. The processor 1702 may control the communications interface 1703 to implement the foregoing receiving and sending functions of the terminal.

The apparatus in this embodiment may be configured to execute the technical solutions of the terminal in the foregoing method embodiments. Their implementation principles and technical effects are similar, and are not described herein again.

It should be noted that, in this embodiment of this application, module division is an example, and is merely logical function division. In an embodiment, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A communication method, implemented by an Internet of things (IoT) platform, wherein the communication method comprises:
    obtaining a historical load of a serving cell of a terminal;
    determining a data reporting time of the terminal based on the historical load of the serving cell; and
    sending the data reporting time to the terminal; and
    receiving, from the terminal, a reporting type of the terminal, wherein the reporting type indicates that a data reporting type of the terminal is periodic reporting or event-triggered reporting.

2. The communication method of claim 1, wherein determining the data reporting time comprises:
    determining a predicted load of the serving cell in a preset time period from a current time based on the historical load of the serving cell; and
    determining the data reporting time based on the predicted load.

3. The communication method of claim 1, wherein obtaining the historical load of the serving cell comprises:
    obtaining a historical load of at least one cell, wherein the at least one cell comprises the serving cell of the terminal; and
    obtaining the historical load of the serving cell from the historical load of the at least one cell based on the serving cell of the terminal.

4. The communication method of claim 3, wherein obtaining the historical load of the at least one cell comprises obtaining the historical load of the at least one cell from a network management device.

5. The communication method of claim 3, wherein obtaining the historical load of the at least one cell comprises obtaining the historical load of the at least one cell from a base station that is a serving base station of the terminal, and wherein the at least one cell is a cell within coverage of the base station.

6. The communication method according to claim 3, wherein obtaining the historical load of the at least one cell comprises obtaining the historical load of the at least one cell from a service capability exposure function (SCEF) network element.

7. The communication method of claim 1, further comprising obtaining a time range in which the terminal reports data, and wherein determining the data reporting time comprises determining the data reporting time based on the historical load of the serving cell and the time range.

8. The method according to claim 7, wherein obtaining the time range comprises receiving the time range from the terminal in which the terminal reports data.

9. The communication method of claim 7, wherein obtaining the time range comprises receiving the time range from an application server corresponding to a service type of the terminal.

10. The communication method of claim 9, wherein before receiving the time range from the application server, the method further comprises:
    receiving first information from the application server indicating a service type provided by the application server, wherein the service type provided by the application server is the same as the service type of the terminal;
    determining at least one time range based on the service type provided by the application server and historical load of at least one cell; and
    sending the at least one time range to the application server to determine the time range corresponding to the service type of the terminal.

11. The communication method of claim 1, wherein after determining the data reporting time of the terminal, the method further comprises:
    receiving a second message from the terminal, wherein the second message comprises information indicating that the serving cell of the terminal changed and information about a new serving cell; and
    updating the data reporting time of the terminal based on a historical load of the new serving cell.

12. The communication method of claim 7, wherein after determining the data reporting time of the terminal, the method further comprises:
    receiving a third message from an application server or the terminal, wherein the third message comprises information indicating that the time range changed and a changed time range in which the terminal reports data; and
    updating the data reporting time of the terminal based on the historical load of the serving cell and the changed time range in which data can be reported.

13. The communication method of claim 1, wherein after determining the data reporting time of the terminal, the method further comprises:
    receiving a fourth message from an application server or the terminal, wherein the fourth message comprises information instructing to change the data reporting time of the terminal; and
    updating the data reporting time of the terminal based on the historical load of the serving cell.

14. A communication method, implemented by a terminal, wherein the communication method comprises:
    sending a time range in which the terminal reports data to an Internet of things (IoT) platform;
    sending a reporting type of the terminal to the IoT platform, wherein the reporting type indicates that a data reporting type of the terminal is periodic reporting or event-triggered reporting;
    receiving a data reporting time of the terminal from the IoT platform; and
    reporting data to the IoT platform based on the data reporting time.

15. The communication method of claim 14, further comprising:
    receiving an updated data reporting time from the IoT platform; and
    reporting data to the IoT platform based on the updated data reporting time.

16. The communication method of claim 14, further comprising sending a message to the IoT platform indicating that the terminal reports data at the data reporting time.

17. An Internet of things (IoT) platform, comprising:
    a processor; and
    a memory coupled to the processor and storing instructions that, when executed by the processor, cause the IoT platform to be configured to:
        obtain historical load of a serving cell of a terminal;
        determine a data reporting time of the terminal based on the historical load of the serving cell; and send the data reporting time to the terminal; and receive a reporting type of the terminal from the terminal, wherein the reporting type indicates that a data reporting type of the terminal is periodic reporting or event-triggered reporting.

18. A terminal, comprising:

a processor; and a memory coupled to the processor and configured to store instructions that, when executed by the processor, cause the terminal to:

send a time range in which the terminal reports data to an Internet of things (IoT) platform;

send a reporting type of the terminal to the IoT platform, wherein the reporting type indicates that a data reporting type of the terminal is periodic reporting or event-triggered reporting;

receive a data reporting time of the terminal from the IoT platform; and report data to the IoT platform based on the data reporting time.

19. The terminal of claim 18, wherein the instructions further cause the terminal to:

receive an updated data reporting time from the IoT platform; and report data to the IoT platform based on the updated data reporting time.

20. The terminal of claim 18, wherein the instructions further cause the terminal to send a message to the IoT platform indicating that the terminal reports data at the data reporting time.

* * * * *